(12) United States Patent
Piazza

(10) Patent No.: US 12,385,442 B1
(45) Date of Patent: Aug. 12, 2025

(54) GEARBOX ASSEMBLY FOR A TURBINE ENGINE

(71) Applicant: GE Avio S.r.l., Rivalta di Torino (IT)

(72) Inventor: Andrea Piazza, Turin (IT)

(73) Assignee: GE AVIO S.R.L., Rivalta di Torino (IT)

( * ) Notice: Subject to any disclaimer, the term of this patent is extended or adjusted under 35 U.S.C. 154(b) by 0 days.

(21) Appl. No.: 18/825,433

(22) Filed: Sep. 5, 2024

(30) Foreign Application Priority Data

Feb. 8, 2024 (IT) .......................... 102024000002653

(51) Int. Cl.
*F02C 7/36* (2006.01)

(52) U.S. Cl.
CPC .......... *F02C 7/36* (2013.01); *F05D 2220/323* (2013.01); *F05D 2240/50* (2013.01); *F05D 2260/4031* (2013.01)

(58) Field of Classification Search
CPC .. F02C 7/36; F05D 2220/323; F05D 2240/50; F05D 2260/4031; F16D 41/069
See application file for complete search history.

(56) References Cited

U.S. PATENT DOCUMENTS

| | | | |
|---|---|---|---|
| 4,799,354 A | 1/1989 | Midgley | |
| 5,845,483 A | 12/1998 | Petrowicz | |
| 6,558,287 B2 * | 5/2003 | Hayabuchi | F16H 3/663 |
| | | | 475/275 |
| 7,805,947 B2 | 10/2010 | Moulebhar | |
| 8,657,714 B1 | 2/2014 | Ghanime et al. | |
| 10,059,201 B2 | 8/2018 | Ekonen et al. | |
| 10,337,349 B2 | 7/2019 | Roberge | |
| 11,047,252 B2 | 6/2021 | Bordoni et al. | |
| 11,092,037 B2 | 8/2021 | Valva et al. | |
| 11,555,521 B2 | 1/2023 | Kowalewski et al. | |
| 11,773,919 B2 | 10/2023 | Yang et al. | |
| 2019/0055852 A1 | 2/2019 | Wuestenberg | |
| 2020/0056507 A1 | 2/2020 | Walker | |
| 2020/0102892 A1 | 4/2020 | Polly et al. | |

FOREIGN PATENT DOCUMENTS

| | | |
|---|---|---|
| FR | 3008463 A1 | 1/2015 |
| FR | 3034140 A1 | 9/2016 |
| FR | 3127024 A1 | 3/2023 |
| FR | 3127025 A1 | 3/2023 |
| FR | 3129436 A1 | 5/2023 |
| FR | 3129690 A1 | 6/2023 |
| FR | 3130747 A1 | 6/2023 |
| FR | 3130875 A1 | 6/2023 |

* cited by examiner

*Primary Examiner* — Steven M Sutherland
(74) *Attorney, Agent, or Firm* — Venable LLP; Peter T. Hrubiec; Michele V. Frank

(57) ABSTRACT

A gearbox assembly for a turbine engine. The turbine engine includes an engine static structure. The gearbox assembly includes a gear assembly, an input shaft coupled to the gear assembly, an output shaft drivingly coupled to the input shaft through the gear assembly, and a gearbox assembly disengagement system. The gearbox assembly disengagement system includes a one-way clutch that engages the gearbox assembly to the engine static structure during a normal operation of the turbine engine and disengages the gearbox assembly from the engine static structure during a reverse torque condition.

20 Claims, 9 Drawing Sheets

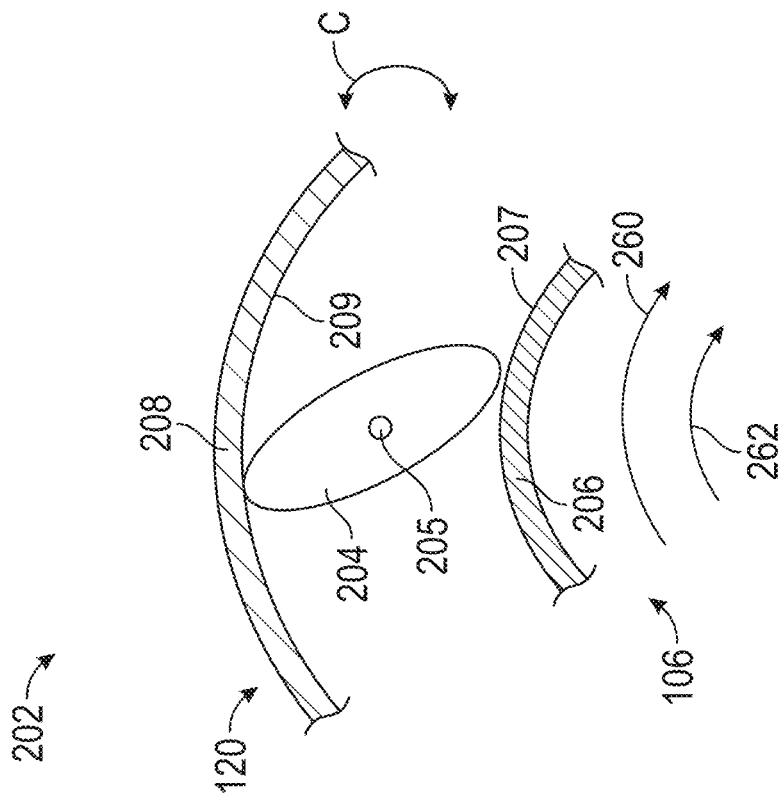
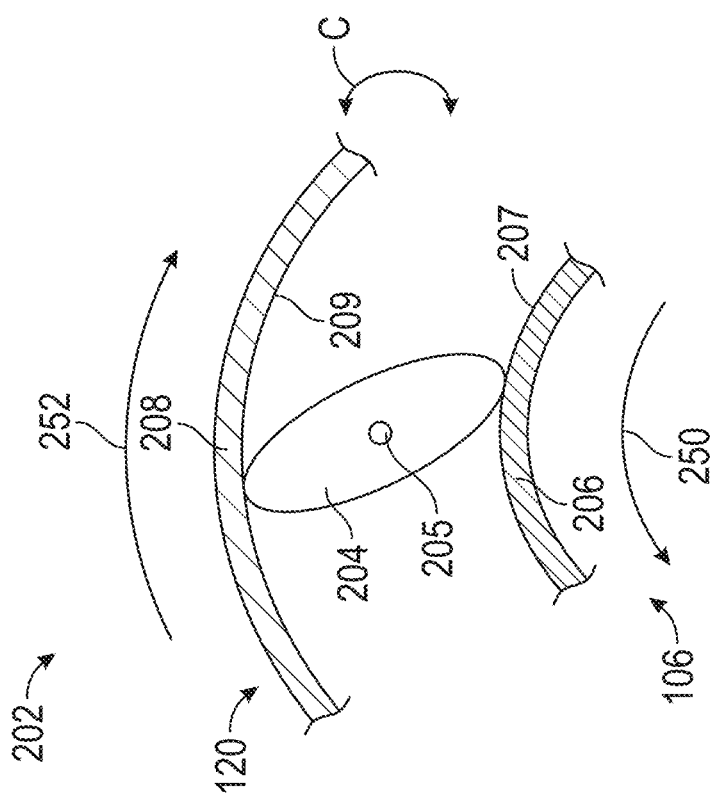
FIG. 2D
FIG. 2E

GEARBOX ASSEMBLY FOR A TURBINE ENGINE

CROSS REFERENCE TO RELATED APPLICATIONS

The present application claims the benefit of Italian Patent Application No. 102024000002653, filed on Feb. 8, 2024, which is hereby incorporated by reference herein in its entirety.

TECHNICAL FIELD

The present disclosure relates generally to gearbox assemblies for turbine engines, particularly, turbine engines for aircraft.

BACKGROUND

Turbine engines generally include a propulsor (e.g., a fan or a propeller) and a turbo-engine arranged in flow communication with one another. The turbo-engine includes a compressor section, a combustion section, and a turbine section. A gearbox assembly may transfer torque and power from the turbo-engine to the propulsor.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, or structurally similar elements.

FIG. 2D is an enlarged schematic partial cross-sectional view of a one-way clutch of the gearbox assembly disengagement system, taken along section line 2D-2D in FIG. 2C, in an engaged position, according to the present disclosure.

FIG. 2E is an enlarged schematic partial cross-sectional view of the one-way clutch of FIG. 2D, in a disengaged position, according to the present disclosure.

DETAILED DESCRIPTION

Figure 1:
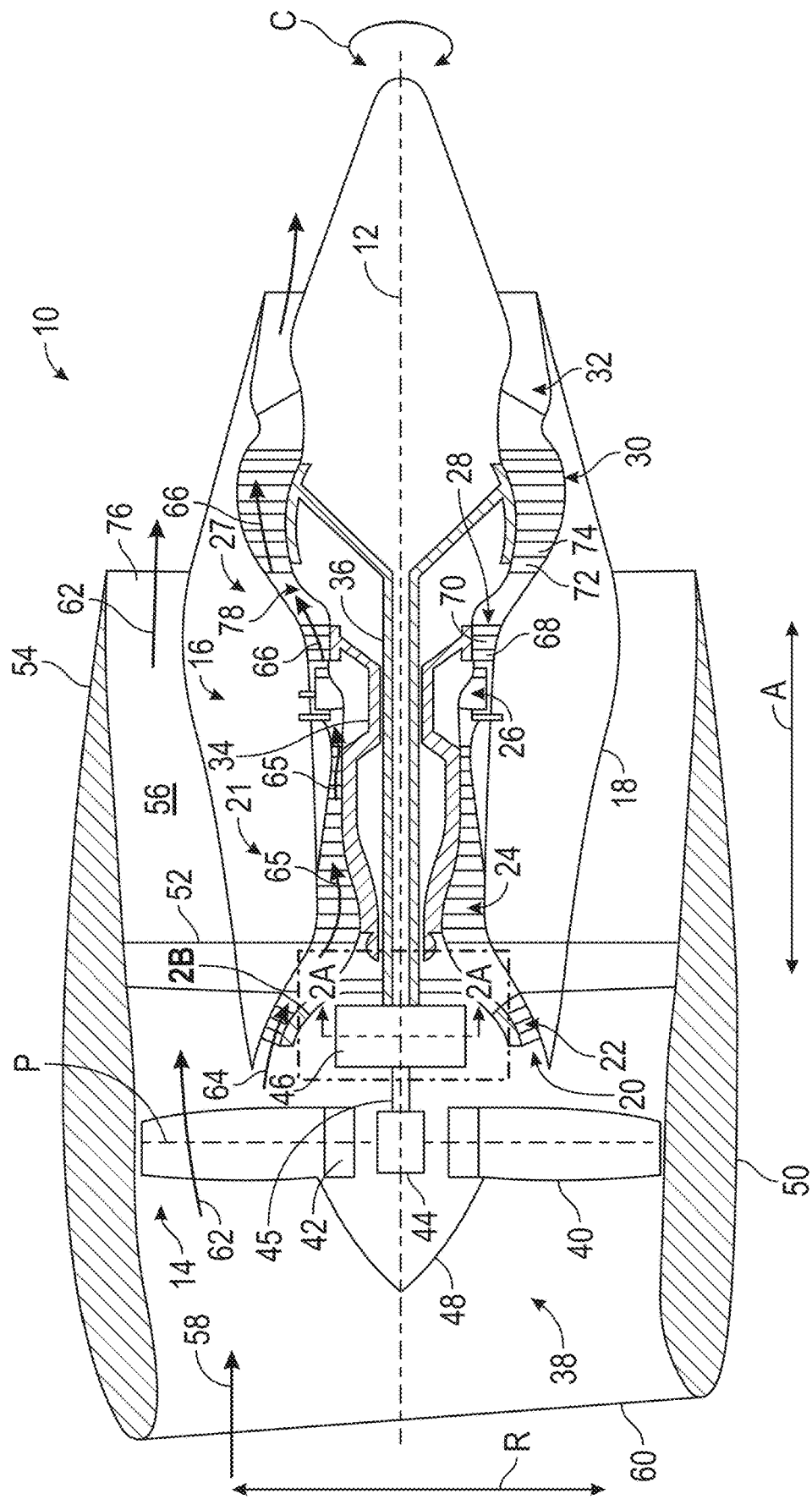
FIG. 1 is a schematic cross-sectional diagram of a turbine engine, taken along a longitudinal centerline axis of the turbine engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle. For example, with regard to a high-bypass turbine engine, forward refers to a position closer to an engine inlet and aft refers to a position closer to an engine nozzle or exhaust. In one example, in a reverse flow turbine engine, forward refers to a position closer to the engine nozzle or exhaust and aft refers to a position closer to an engine inlet.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, a "propulsor" is a component of the turbine engine that is drivingly coupled to the turbo-engine such that rotation of the components of the turbo-engine causes the propulsor to rotate and to generate thrust. A propulsor can include a fan or a propeller. In turbofan engines (ducted fan engines or unducted fan engines), the propulsor is a fan. In turboprop engines, the propulsor is a propeller.

As used herein, "normal operation" of a turbine engine is intended to mean when the turbine engine is operating and torque is transferred from the turbo-engine to the propulsor through the gearbox assembly in an operational torque direction.

As used herein, a "reverse torque condition" is when torque is transferred from the output shaft to the input shaft through the gearbox assembly in a reverse torque direction that is opposite the operational torque direction. The reverse torque condition can occur when the gearbox assembly or the turbine engine is shut down. In the case of a turbine engine, the reverse torque condition can occur when the propulsor is windmilling and causing the propulsor shaft to rotate, thereby rotating the gears of the gearbox assembly.

As used herein, "windmill" or "windmilling" is a condition when the propulsor and the low-pressure shaft of the turbine engine continue to rotate at low speeds, while the high-pressure shaft rotates slowly or even stops. Windmilling can occur when the turbine engine is shut down, but air still flows across the propulsor, such as during an in-flight engine shutdown or when the turbine engine is on the ground and the propulsor is rotating in the presence of wind when the turbine engine is shut down. During windmilling, torque is transferred from the output shaft (e.g., the propulsor) to the input shaft (e.g., the turbo-engine) through the gearbox assembly in a windmilling rotational direction (e.g., the reverse torque rotational direction) that is opposite the operational rotational direction.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components or the systems or manufacturing the components or the systems. For example, the approximating language may refer to being within a one, a two, a four, a ten, a fifteen, or a twenty percent margin in either individual values, range(s) of values or endpoints defining range(s) of values.

The present disclosure provides for a gearbox assembly for a vehicle, having one or more bearings therein. In operation, the gearbox assembly transfers torque from an input shaft to an output shaft through the gear assembly. In one embodiment, the gearbox assembly is for a turbine engine, and the input shaft is a low-pressure shaft of a turbo-engine of the turbine engine and the output shaft is a propulsor shaft of the turbine engine. In this way, the turbo-engine transfers torque to the propulsor shaft through the gearbox assembly to rotate a propulsor of the turbine engine.

The bearings allow rotation of one or more gears of the gearbox assembly about the bearings. In one embodiment, one or more of the bearings are journal bearings. The bearings can include any type of bearings, such as, for example, roller bearings, ball bearings, or the like. The bearings, especially, journal bearings, are hydrodynamic bearings that typically require a steady supply of lubricant during all operational phases of the gearbox assembly to properly lubricate the bearings to prevent damage due to sliding contact for hydrodynamic journal bearings or even for the generic gear mesh interface. Typically, a lubrication system supplies the lubricant to the bearings during operation of the gearbox assembly (e.g., while the turbine engine or the vehicle is powered on and operating).

The input shaft or the output shaft of the gearbox assembly may experience long duration, continued rotation following a shutdown of the turbine engine. For example, torque may be transferred from the output shaft to the input shaft in a reverse torque condition when the gearbox assembly is shut down. In one embodiment, this reverse torque condition occurs when the propulsor of the turbine engine is windmilling. In such instances, the bearings can be affected by not receiving enough lubricant for lubricating the bearings. For example, during the reverse torque condition (e.g., windmilling), the rotational speed of the shafts may be too low to power a pump that pumps the lubricant to the bearings. In some instances, e.g., during operation of the vehicle (e.g., when the turbine engine of an aircraft is in-flight), the lubrication system may lose pressure (e.g., due to a failure of the pump or other components of the lubrication system), such that the lubrication system is unable to provide the lubricant to the bearings.

The criticality of the lubricant interruptions increases when the bearings are journal bearings, since the absence of lubricant at the journal bearings can lead to a journal bearing failure and subsequent gearbox failure, which may cause the input shaft (e.g., the low-pressure shaft) to lock up permanently. Such a failure of the journal bearings is referred to as a journal bearing seizure and occurs when there is contact between a pin and a bore of one of the gears of the gear assembly, thereby causing a significant increase of wear and friction that leads to bearing failure. If contact occurs between the journal bearing and the pin during high-power operation, the two components can become welded together due to the high temperature from the friction.

Some gearbox assemblies include an auxiliary lubrication system that includes an auxiliary pump to supply lubricant to the bearings to prevent damage to the bearings due to inadequate lubricant supply during the reverse torque condition. Such auxiliary lubrication systems, however, require added complexity for driving the auxiliary pump. Further, the auxiliary pump requires added complexity to provide the lubricant during high speeds, such as during operation of the gearbox assembly (e.g., of the turbine engine or the vehicle), and during low speeds, such as during the reverse torque condition (e.g., during windmilling). During the reverse torque condition, the propulsor can rotate in a reverse torque rotational direction that is opposite an operational rotational direction of the gearbox assembly. This adds significant complexity to the auxiliary pump as the auxiliary pump needs to operate over a large speed range, and provide a flow of the lubricant regardless of the rotational direction of the output shaft (e.g., of the propulsor).

Accordingly, the present disclosure provides a gearbox assembly disengagement system that disengages the gearbox assembly from a static structure of the turbine engine during the reverse torque condition. This causes the entire gearbox assembly to rotate during the reverse torque condition such that there is no relative rotation of the gears. Thus, the bearings do not rotate, and the present disclosure removes the need for the turbine engine to have an auxiliary lubrication system to supply lubricant during the reverse torque condition. In particular, the output shaft (e.g., the propulsor shaft) is disengaged from the gear assembly. Such a configuration helps to simplify the lubrication system by not requiring an auxiliary lubrication system during reverse torque conditions (e.g., windmilling).

The gear assembly includes a first gear, a plurality of second gears, and a third gear. The gearbox assembly disengagement system can be utilized in a planetary arrangement or in a star arrangement of the gear assembly. In the planetary arrangement, the output shaft is drivingly coupled to the plurality of second gears (e.g., by a second gear carrier), and the third gear is coupled to an engine static structure such that the third gear is stationary during normal operation of the gearbox assembly. During the reverse torque condition, the gearbox assembly disengagement system disengages the third gear from the engine static structure such that the third gear rotates. In the star arrangement, the output shaft is drivingly coupled to the third gear, and the plurality of second gears (e.g., the second gear carrier) is coupled to the engine static structure such that the plurality of second gears is stationary about a longitudinal centerline axis of the turbine engine during the normal operation. During the reverse torque condition, the gearbox assembly disengagement system disengages the second gear carrier from the engine static structure such that the second gear carrier (e.g., and the plurality of second gears) rotate about the longitudinal centerline axis.

The gearbox assembly disengagement system is actuated to disengage the gear assembly from the engine static structure by a torque from the output shaft to the gear assembly during the reverse torque condition. In this way, the gearbox assembly disengagement system locks the gear assembly to the engine static structure during the normal operation, and unlocks the gear assembly from the engine static structure during the reverse torque condition. The gearbox assembly disengagement system includes a locking system including a one-way clutch that engages the gear assembly during the normal operation, and disengages the gear assembly during the reverse torque condition. In particular, an operational torque is transferred from the input shaft to the output shaft through the gear assembly in a first torque direction during the normal operation, and a reverse torque is transferred from the output shaft to the input shaft in a second torque direction during the reverse torque condition. The second torque direction is opposite the first torque direction. The operational torque in the first torque direction causes the one-way clutch to engage the gearbox assembly (e.g., the second gear carrier or the third gear) such that the one-way clutch prevents the gearbox assembly from rotating. In particular, the one-way clutch locks the gearbox assembly to the engine static structure during the normal operation. The reverse torque in the second torque direction causes the one-way clutch to disengage the gearbox assembly such that the one-way clutch allows the gearbox assembly to rotate during the reverse torque condition. This allows rotation of the first gear, the plurality of second gears, and the third gear such that there is no relative rotation among the first gear, the plurality of second gears, and the third gear.

Accordingly, the gearbox assembly disengagement system of the present disclosure disengages the gearbox assembly from the engine static structure to allow rotation of all of the gears of the gear assembly. With rotation of all the gears, there is no relative rotation among the gears, and the bearings do not require the lubricant. Thus, the gearbox assembly disengagement system prevents bearing seizure during the reverse torque condition without having to supply lubricant to the bearings during the reverse torque condition. Therefore, the gearbox assembly disengagement system of the present disclosure eliminates the need for an auxiliary lubrication system and reduces complexity of the lubrication system as compared to gearbox assemblies without the benefit of the present disclosure. Further, the one-way clutch provides for simplicity of the gearbox assembly disengagement system as compared to disengagement systems without the benefit of the present disclosure.

Referring now to the drawings, FIG. 1 is a schematic cross-sectional diagram of a turbine engine 10, taken along a longitudinal centerline axis 12 of the turbine engine 10, according to an embodiment of the present disclosure. As shown in FIG. 1, the turbine engine 10 defines an axial direction A extending parallel to the longitudinal centerline axis 12, a radial direction R that is normal to the axial direction A, and a circumferential direction C that extends arcuately about the longitudinal centerline axis 12.

In general, the turbine engine 10 includes a propulsor section 14 and a turbo-engine 16 disposed downstream from the propulsor section 14. The turbo-engine 16 includes, in serial flow relationship, a compressor section 21, a combustor 26, and a turbine section 27. The turbo-engine 16 is substantially enclosed within an outer casing 18 that is substantially tubular and defines a core inlet 20 that is annular about the longitudinal centerline axis 12. As schematically shown in FIG. 1, the compressor section 21 includes a booster or a low pressure (LP) compressor 22 followed downstream by a high pressure (HP) compressor 24. The combustor 26 is downstream of the compressor section 21. The turbine section 27 is downstream of the combustor 26 and includes a high pressure (HP) turbine 28 followed downstream by a low pressure (LP) turbine 30. The turbo-engine 16 further includes a jet exhaust nozzle section 32 that is downstream of the turbine section 27, a high-pressure (HP) shaft 34, and a low-pressure (LP) shaft 36. The HP shaft 34 drivingly connects the HP turbine 28 to the HP compressor 24, and the HP compressor 24, the HP turbine 28, and the HP shaft 34 are together referred to as an HP spool. The HP turbine 28 and the HP compressor 24 rotate in unison through the HP shaft 34. The LP shaft 36 drivingly connects the LP turbine 30 to the LP compressor 22, and the LP compressor 22, the LP turbine 30, and the LP shaft 36 are together referred to as an LP spool. The LP turbine 30 and the LP compressor 22 rotate in unison through the LP shaft 36. The compressor section 21, the combustor 26, the turbine section 27, and the jet exhaust nozzle section 32 together define a core air flow path.

For the embodiment depicted in FIG. 1, the propulsor section 14 includes a propulsor 38 (e.g., a variable pitch propulsor) having a plurality of propulsor blades 40 coupled to a disk 42 in a spaced apart manner. In the embodiment of FIG. 1, the propulsor 38 is a fan that is driven by the turbo-engine 16. In some embodiments, the propulsor 38 is a propeller that is driven by the turbo-engine 16. The propulsor blades 40 extend outwardly from the disk 42 generally along the radial direction R. In the case of a variable pitch propulsor, the plurality of propulsor blades 40 is rotatable relative to the disk 42 about a pitch axis P by virtue of the propulsor blades 40 being operatively coupled to an actuation member 44 configured to collectively vary the pitch of the propulsor blades 40 in unison. The propulsor blades 40, the disk 42, and the actuation member 44 are together rotatable about the longitudinal centerline axis 12 via a propulsor shaft 45 that is powered by the LP shaft 36 across a power gearbox, also referred to as a gearbox assembly 46 (e.g., the turbine engine 10 is an indirect drive engine). In this way, the propulsor 38 is drivingly coupled to, and powered by, the turbo-engine 16. The gearbox assembly 46 is shown schematically in FIG. 1. The gearbox assembly 46 is a reduction gearbox assembly for adjusting the rotational speed of the propulsor shaft 45 and, thus, the propulsor 38 relative to the LP shaft 36 when power is transferred from the LP shaft 36 to the propulsor shaft 45.

Referring still to the exemplary embodiment of FIG. 1, the disk 42 is covered by a propulsor hub 48 that is aerodynamically contoured to promote an airflow through the plurality of propulsor blades 40. In addition, the propulsor section 14 includes an annular casing or a nacelle 50 that circumferentially surrounds the propulsor 38 and at least a portion of the turbo-engine 16. The nacelle 50 is supported relative to the turbo-engine 16 by a plurality of outlet guide vanes 52 that is circumferentially spaced about the nacelle 50 and the turbo-engine 16. Moreover, a downstream section 54 of the nacelle 50 extends over an outer portion of the turbo-engine 16, and, with the outer casing 18, defines a bypass airflow passage 56 therebetween.

During operation of the turbine engine 10, a volume of air 58 enters the turbine engine 10 through an inlet 60 of the nacelle 50 or the propulsor section 14. As the volume of air 58 passes across the propulsor blades 40, a first portion of air, also referred to as bypass air 62, is directed into the bypass airflow passage 56. At the same time, a second portion of air, also referred to as core air 64, is directed into the upstream section of the core air flow path through the core inlet 20 of the LP compressor 22. The ratio between the bypass air 62 and the core air 64 is commonly known as a bypass ratio. The pressure of the core air 64 is then increased through the LP compressor 22, generating compressed air 65. The compressed air 65 is directed through the HP compressor 24, where the pressure of the compressed air 65 is further increased. The compressed air 65 is then directed into the combustor 26, where the compressed air 65 is mixed with fuel and ignited to generate combustion gases 66.

The combustion gases 66 are directed into the HP turbine 28 and expanded through the HP turbine 28 where a portion of thermal energy or kinetic energy from the combustion gases 66 is extracted via one or more stages of HP turbine stator vanes 68 and HP turbine rotor blades 70 that are coupled to the HP shaft 34. This causes the HP shaft 34 to rotate, thereby supporting operation of the HP compressor 24 through the HP shaft 34 (self-sustaining cycle). In this way, the combustion gases 66 do work on the HP turbine 28. The combustion gases 66 are then directed into the LP turbine 30 and expanded through the LP turbine 30. Here, a second portion of the thermal energy or the kinetic energy is extracted from the combustion gases 66 via one or more stages of LP turbine stator vanes 72 and LP turbine rotor blades 74 that are coupled to the LP shaft 36. This causes the LP shaft 36 to rotate, thereby supporting operation of the LP compressor 22 (self-sustaining cycle) and rotation of the propulsor 38 through the LP shaft 36 via the gearbox assembly 46. In this way, the combustion gases 66 do work on the LP turbine 30.

The combustion gases 66 are subsequently directed through the jet exhaust nozzle section 32 of the turbo-engine 16 to provide propulsive thrust. Simultaneously, the bypass air 62 is routed through the bypass airflow passage 56 before being exhausted from a propulsor nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the turbo-engine 16.

The turbine engine 10 depicted in FIG. 1 is by way of example only. In other exemplary embodiments, the turbine engine 10 may have any other suitable configuration. For example, in other exemplary embodiments, the propulsor 38 may be configured in any other suitable manner (e.g., as a fixed pitch propulsor) and further may be supported using any other suitable propulsor frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, turboprop, or turboshaft engines.

Figure 2A:
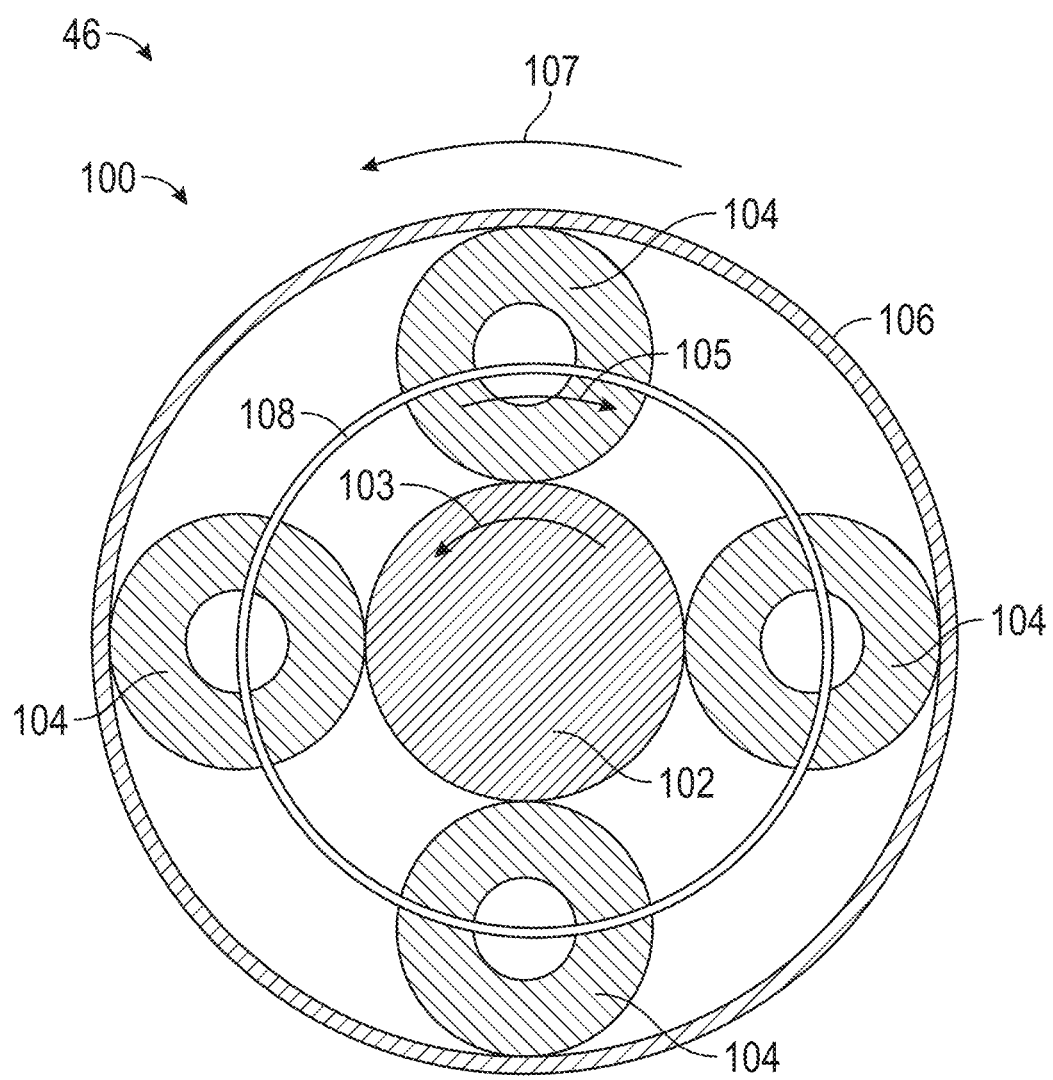
FIG. 2A is a schematic cross-sectional view of a gearbox assembly of the turbine engine of FIG. 1, taken along section line 2A-2A, and having a gear assembly, according to the present disclosure.
Figure 2B:
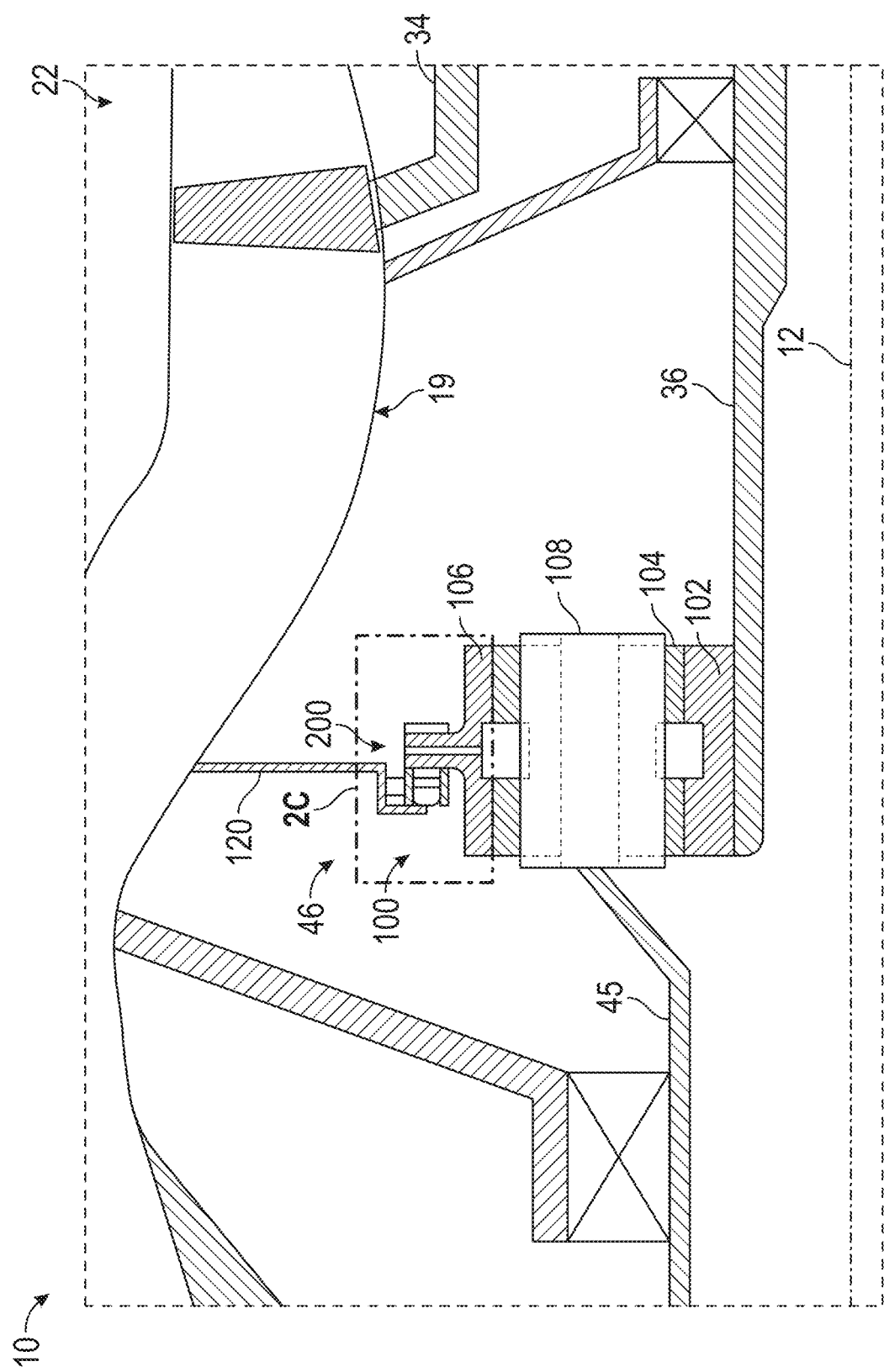
FIG. 2B is a schematic partial cross-sectional view of the gearbox assembly and the turbine engine, taken at detail 2B in FIG. 1, according to the present disclosure.

FIG. 2A is a schematic partial cross-sectional view of the gearbox assembly 46, taken along section line 2A-2A of FIG. 1, according to the present disclosure. FIG. 2B is a schematic partial cross-sectional view of the gearbox assembly and the turbine engine, taken at detail 2B in FIG. 1, according to the present disclosure.

The gearbox assembly 46 includes a gear assembly 100 including a plurality of gears 102, 104, and 106. The plurality of gears 102, 104, and 106 include a first gear 102, a plurality of second gears 104, and a third gear 106. In FIG. 2A, the first gear 102 is a sun gear, the second gears 104 are planet gears, and the third gear is a ring gear. While one first gear 102, four second gears 104, and one third gear 106 are shown in FIG. 2A, the gear assembly 100 can include one or more first gears 102, one or more second gears 104, and one or more third gears 106. The plurality of second gears 104 is constrained by a second gear carrier 108. The gearbox assembly 46 also includes an input shaft and an output shaft. As shown in FIG. 2B, the input shaft is the LP shaft 36, and the output shaft is the propulsor shaft 45. In some embodiments, the input shaft is the HP shaft 34. The output shaft is the propulsor shaft 45 such that the turbo-engine 16 (FIG. 1) drives the propulsor 38 (FIG. 1) through the gearbox assembly 46.

The gear assembly 100 can be arranged as an epicyclic gear assembly. In the epicyclic gear assembly, the gear assembly 100 can be arranged in a planetary arrangement, in which the third gear 106 is held fixed, with the second gear carrier 108 allowed to rotate. In such an arrangement, the output shaft (e.g., the propulsor shaft 45) is driven by the second gear carrier 108. For example, the second gear carrier 108 is coupled to the propulsor shaft 45 such that rotation of the second gear carrier 108 causes the propulsor shaft 45, and, thus, the propulsor 38, to rotate. In this way, the plurality of second gears 104 (e.g., via the second gear carrier 108) is the output of the gear assembly 100. However, other suitable types of gear assemblies may be employed, such as a star arrangement, as detailed further below with respect to FIGS. 3A and 3B. In this way, at least one of the third gear 106 or the second gear carrier 108 is stationary and prevented from rotating about the longitudinal centerline axis 12 during normal operation of the gearbox assembly 46 (e.g., of the turbine engine 10). While an epicyclic gear assembly is detailed herein, the gear assembly 100 can include any type of gear assembly including, for example, a compound gear assembly, a multiple stage gear assembly, or the like.

The first gear 102 is coupled to the input shaft of the gearbox assembly 46 such that rotation of the input shaft causes the first gear 102 to rotate. In particular, the first gear 102 is coupled to the LP shaft 36 such that rotation of the LP shaft 36 causes the first gear 102 to rotate. In this way, the input shaft applies an input torque 103 through the first gear 102 in an input torque direction such that the first gear 102 rotates in a first rotational direction. Radially outward of the first gear 102, and intermeshing therewith, is the plurality of second gears 104 that is supported by the second gear carrier 108. The second gear carrier 108 supports and constrains the plurality of second gears 104 such that each of the plurality of second gears 104 is enabled to rotate about a second gear longitudinal centerline axis of each of the plurality of second gears 104 and to rotate about the periphery of the first gear 102 (about the longitudinal centerline axis 12 of the turbine engine 10). In particular, the first gear 102 transfers the input torque 103 to the plurality of second gears 104 such that the first gear 102 applies an output torque 105 on the plurality of second gears 104 in an output torque direction such that the plurality of second gears 104 rotates in a second rotational direction about the longitudinal centerline axis 12. In the embodiment of FIGS. 2A and 2B, the output torque direction is opposite the input torque direction such that the second rotational direction is opposite the first rotational direction. In this way, the plurality of second gears 104 rotates the second gear carrier 108, thereby rotating to drive rotation of the output shaft. In particular, the second gear carrier 108 is coupled via the propulsor shaft 45 to the propulsor 38 (FIG. 1) and rotates to drive rotation of the propulsor 38 about the longitudinal centerline axis 12 in the second rotational direction.

Radially outwardly of the plurality of second gears 104, and intermeshing therewith, is the third gear 106, which is an annular ring gear. In particular, the plurality of second gears 104 reacts against the third gear 106, which is stationary, such that the third gear 106 applies a reaction torque 107 against the plurality of second gears 104 in a reaction torque direction. The reaction torque direction is opposite the output torque direction. In the embodiment of FIGS. 2A and 2B, the reaction torque direction is the same as the input torque direction.

As shown in FIG. 2B, the turbine engine 10 includes an engine static structure 19. The engine static structure 19 is a non-rotational part of the turbine engine 10 and forms an inner portion of the core air flow path. The gearbox assembly 46 is coupled to the engine static structure 19 by a gearbox assembly coupling 120. The gearbox assembly coupling 120 is coupled to the third gear 106 such that the gearbox assembly coupling 120 transfers a load from the third gear 106 to the engine static structure 19. The gearbox assembly 46 comprises a gearbox assembly disengagement system 200 that selectively disengages the gearbox assembly 46 from the engine static structure 19 such that the gearbox assembly 46 rotates with rotation of the propulsor 38 (FIG. 1), as detailed further below.

Figure 2C:
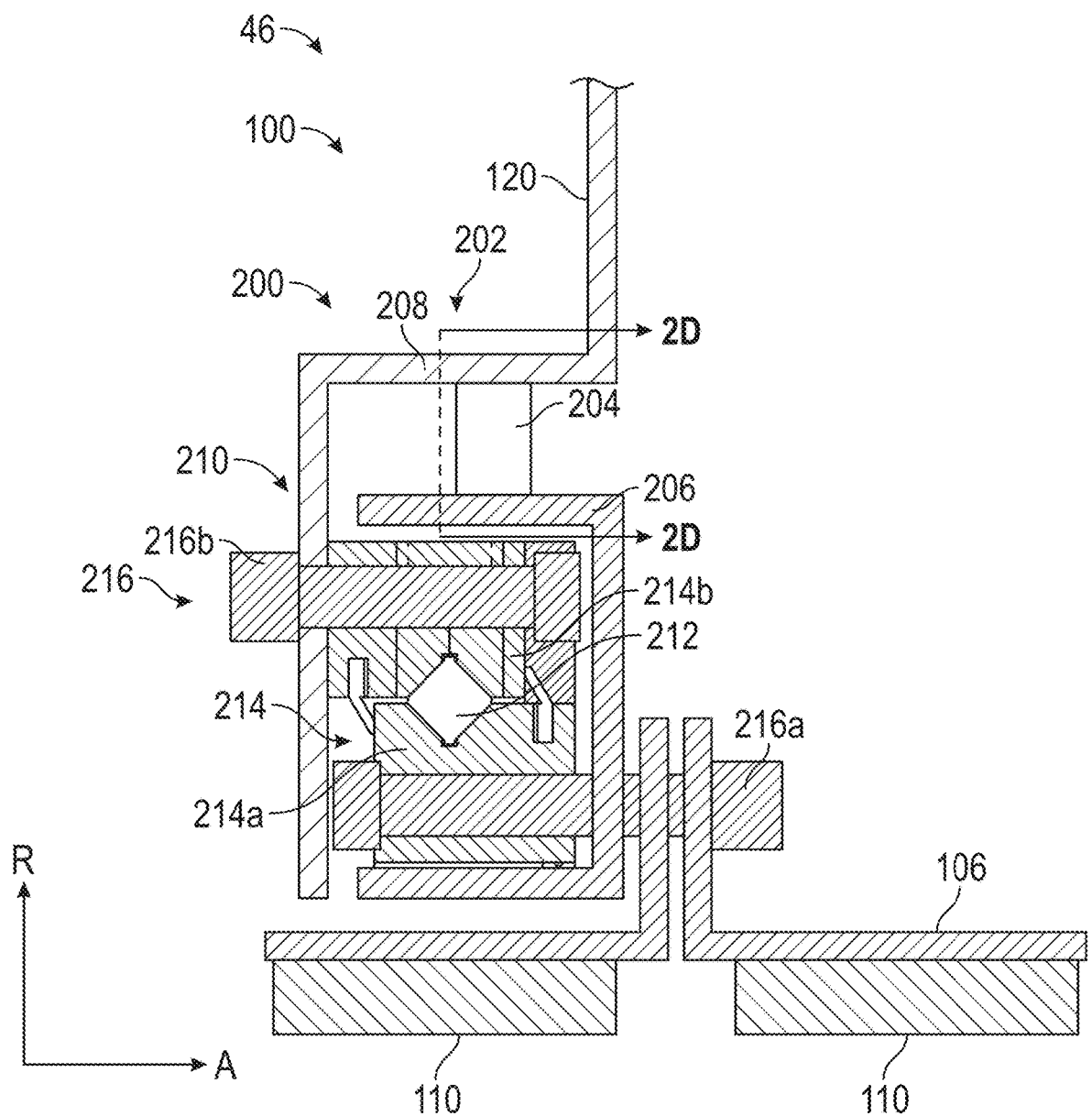
FIG. 2C is an enlarged schematic cross-sectional view of a gearbox assembly disengagement system for the gearbox assembly, taken at detail 2C in FIG. 2B, according to the present disclosure.

FIG. 2C is an enlarged schematic cross-sectional view of the gearbox assembly disengagement system 200, taken at detail 2C in FIG. 2B, according to the present disclosure. FIG. 2C shows the third gear 106 includes a plurality of third gear teeth 110 (shown schematically in FIG. 2C). The third gear 106 is a compound gear such that the plurality of third gear teeth 110 includes a forward set of third gear teeth 110 and an aft set of third gear teeth 110. In some embodiments, the third gear 106 includes a single set of third gear teeth 110.

The gearbox assembly disengagement system 200 includes a one-way clutch 202. The one-way clutch 202 includes a plurality of sprags 204 (only one shown in FIG. 2C). The plurality of sprags 204 is disposed between the third gear 106 and the gearbox assembly coupling 120. In particular, the plurality of sprags 204 is disposed between a first sprag seat 206 and a second sprag seat 208. The first sprag seat 206 is defined by the third gear 106 and is annular. For example, the first sprag seat 206 extends substantially axially from the third gear 106. In FIG. 2C, the first sprag seat 206 is coupled to the third gear 106. In some embodiments, the first sprag seat 206 forms a single, unitary component with the third gear 106. The second sprag seat 208 is defined by the gearbox assembly coupling 120 and is annular. For example, the second sprag seat 208 extends substantially axially from the gearbox assembly coupling 120. The first sprag seat 206 is radially inward of the second sprag seat 208. In some embodiments, the first sprag seat 206 can be radially outward of the second sprag seat 208. The plurality of sprags 204 selectively engages and disengages the third gear 106 (e.g., the first sprag seat 206), as detailed further below.

The gearbox assembly disengagement system 200 also includes one or more bearings 210 that support the third gear 106, and allow the third gear 106 to rotate, with respect to the gearbox assembly coupling 120. The one or more bearings 210 are roller bearings that include a plurality of rolling elements 212. In particular, the one or more bearings 210 are single row crossed roller bearings. In such a configuration, the one or more bearings 210 include a single row of the plurality of rolling elements 212. The one or more bearings 210 constrain the third gear 106 in the axial direction A and in the radial direction R using only the single row of the plurality of rolling elements 212. In particular, the plurality of rolling elements 212 are disposed at an angle to distribute loads between the third gear 106 and the gearbox assembly coupling 120 in the axial direction A and in the radial direction R. The one or more bearings 210 also constrain a bending moment that is perpendicular to the axis of rotation of the third gear 106. In this way, the one or more bearings 210 support the third gear 106 in all degrees of freedom, except in the rotational direction, to allow the third gear 106 to rotate when the one-way clutch 202 is disengaged, as detailed further below. The one or more bearings 210 include a plurality of rings 214 that constrains the plurality of rolling elements 212 therein. In particular, the plurality of rings 214 includes a first ring 214a and a second ring 214b, and the plurality of rolling elements 212 is disposed between the first ring 214a and the second ring 214b.

The one or more bearings 210 are coupled to the third gear 106 and the gearbox assembly coupling 120 by one or more coupling mechanisms 216. The one or more coupling mechanisms 216 can include, for example, bolts, pins, or the like, for securing the one or more bearings 210 to the third gear 106 and the gearbox assembly coupling 120. In particular, the one or more coupling mechanisms 216 include a first coupling mechanism 216a and a second coupling mechanism 216b. The first ring 214a is coupled to the third gear 106 by the first coupling mechanism 216a. The second ring 214b is coupled to the gearbox assembly coupling 120 by the second coupling mechanism 216b. In some embodiments, the third gear 106 defines the first ring 214a such that the first ring 214a and the third gear 106 form a single, unitary component. In some embodiments, the gearbox assembly coupling 120 defines the second ring 214b such that the second ring 214b and the gearbox assembly coupling 120 form a single, unitary component.

FIG. 2D is an enlarged schematic partial cross-sectional view of the one-way clutch 202, taken along section line 2D-2D in FIG. 2C, in an engaged position, according to the present disclosure. FIG. 2E is an enlarged schematic partial cross-sectional view of the one-way clutch 202 of FIG. 2D, in a disengaged position, according to the present disclosure. The plurality of sprags 204 is spaced circumferentially about the third gear 106 (the first sprag seat 206) and the gearbox assembly coupling 120 (the second sprag seat 208). Each sprag 204 is rotationally coupled about a pin 205. The sprags 204 are coupled, either directly or indirectly, to the gearbox assembly coupling 120 (the second sprag seat 208). In the embodiment of FIGS. 2D and 2E, the sprags 204 are illustrated as coupled to a radially inner surface 209 of the gearbox assembly coupling 120 (the second sprag seat 208).

The sprags 204 selectively engage a radially outer surface 207 of the third gear 106 (the first sprag seat 206), as detailed further below.

Referring to FIGS. 2B and 2D, when the gearbox assembly 46 (the turbine engine 10) is operating during normal operation, the input shaft (e.g., the LP shaft 36) rotates, which causes torque to be transferred from the input shaft to the output shaft (e.g., the propulsor shaft 45) through the gearbox assembly 46. This causes the output shaft to rotate in an operational rotational direction. During the normal operation, the gearbox assembly disengagement system 200 engages the gearbox assembly 46 (e.g., the third gear 106) such that the gearbox assembly 46 is engaged with the gearbox assembly coupling 120. This prevents the gearbox assembly 46 (e.g., the third gear 106) from rotating. In particular, the plurality of sprags 204 engages with the gearbox assembly 46 (e.g., the first sprag seat 206 of the third gear 106) and the gearbox assembly coupling 120 (e.g., the second sprag seat 208). That is, friction between the sprags 204 and the radially outer surface 207 of the third gear 106 prevents the gearbox assembly (e.g., the third gear 106) from rotating, while the other gears (e.g., the first gear 102 and the plurality of second gears 104) rotate about the longitudinal centerline axis 12.

The torque from the input shaft is transferred through the gear assembly 100 to the gearbox assembly coupling 120. In particular, the gear assembly 100 transfers the torque, referred to as a gearbox assembly operational torque 250, from the gearbox assembly 46 (e.g., from the third gear 106) to the gearbox assembly coupling 120, and the gearbox assembly operational torque 250 acts on the gearbox assembly coupling 120. The gearbox assembly operational torque 250 acts in a first torque direction as indicated by the gearbox assembly operational torque 250 in FIG. 2D. The gearbox assembly coupling 120 applies a reaction torque, also referred to as a gearbox assembly coupling reaction torque 252, on the gearbox assembly 46 (e.g., on the third gear 106).

The torque transfer from the gearbox assembly 46 to the gearbox assembly coupling 120, and the reaction torque transfer from the gearbox assembly coupling 120 to the gearbox assembly 46, occurs due to the plurality of sprags 204 engaging (contacting) both the gearbox assembly 46 (e.g., at the radially outer surface 207 of the third gear 106) and the gearbox assembly coupling 120 (e.g., at the radially inner surface 209 of the gearbox assembly coupling 120) during the normal operation. For example, there is a tendency for the sprags 204 to pivot about the pins 205 to a position that is more radially inclined than the disengaged position of FIG. 2E. Thus, the third gear 106 and the gearbox assembly 46 are prevented from rotating during the normal operation.

With reference to FIGS. 2B, 2C, and 2E, during a reverse torque condition (e.g., when the propulsor 38 is windmilling), the torque is transferred from the output shaft (e.g., the propulsor shaft 45) to the input shaft (e.g., the LP shaft 36) through the gearbox assembly 46. In such conditions, the output shaft rotates in a reverse torque rotational direction. During the reverse torque condition, the gearbox assembly disengagement system 200 disengages the gearbox assembly 46 (e.g., the third gear 106) such that the gearbox assembly 46 is disengaged from the gearbox assembly coupling 120. This allows the gearbox assembly 46 (e.g., the third gear 106) to rotate such that there is no relative rotation of the plurality of gears 102, 104, and 106 of the gear assembly 100. In particular, the plurality of sprags 204 disengages from the gearbox assembly 46 (e.g., the first sprag seat 206 of the third gear 106) such that the sprags 204 allow the gearbox assembly 46 (e.g., the third gear 106) to rotate with respect to the gearbox assembly coupling 120.

The torque from the output shaft is transferred through the gear assembly 100. In particular, the gear assembly 100 transfers the torque, referred to as a gearbox assembly reverse torque 260, to rotate the gearbox assembly 46 (e.g., the third gear 106). The gearbox assembly reverse torque 260 acts in a second torque direction as indicated by the gearbox assembly reverse torque 260 in FIG. 2E. The second torque direction is opposite the first torque direction such that the gearbox assembly reverse torque 260 is opposite the gearbox assembly operational torque (FIG. 2D). This causes the plurality of sprags 204 to disengage from the gearbox assembly 46 (e.g., from the first sprag seat 206 of the third gear 106). In particular, the sprags 204 pivot about the pins 205 to a position that is less radially inclined than the engaged position of FIG. 2D. When the sprags 204 are disengaged from the gearbox assembly 46, there is no torque reaction from the gearbox assembly coupling 120 on the gearbox assembly 46. Thus, the gearbox assembly 46 (e.g., the third gear 106) rotates with respect to the gearbox assembly coupling 120 in a gearbox assembly reverse torque rotational direction 262. Accordingly, the gearbox assembly 46 (e.g., the third gear 106) rotates during the reverse torque condition such that there is no relative rotation between the plurality of gears 102, 104, and 106. That is, the gears 102, 104, and 106 are static relative to each other.

During the reverse torque condition, and, while the gearbox assembly 46 is rotating, the one or more bearings 210 support the gearbox assembly 46. In particular, the one or more bearings 210 support rotation of the gearbox assembly 46 (e.g., the third gear 106) in the circumferential direction C, while constraining the gearbox assembly 46 in the radial direction R and the axial direction A. Thus, the one or more bearings 210 support rotation of the gearbox assembly 46 with respect to the gearbox assembly coupling 120 during the reverse torque condition.

Figure 3A:
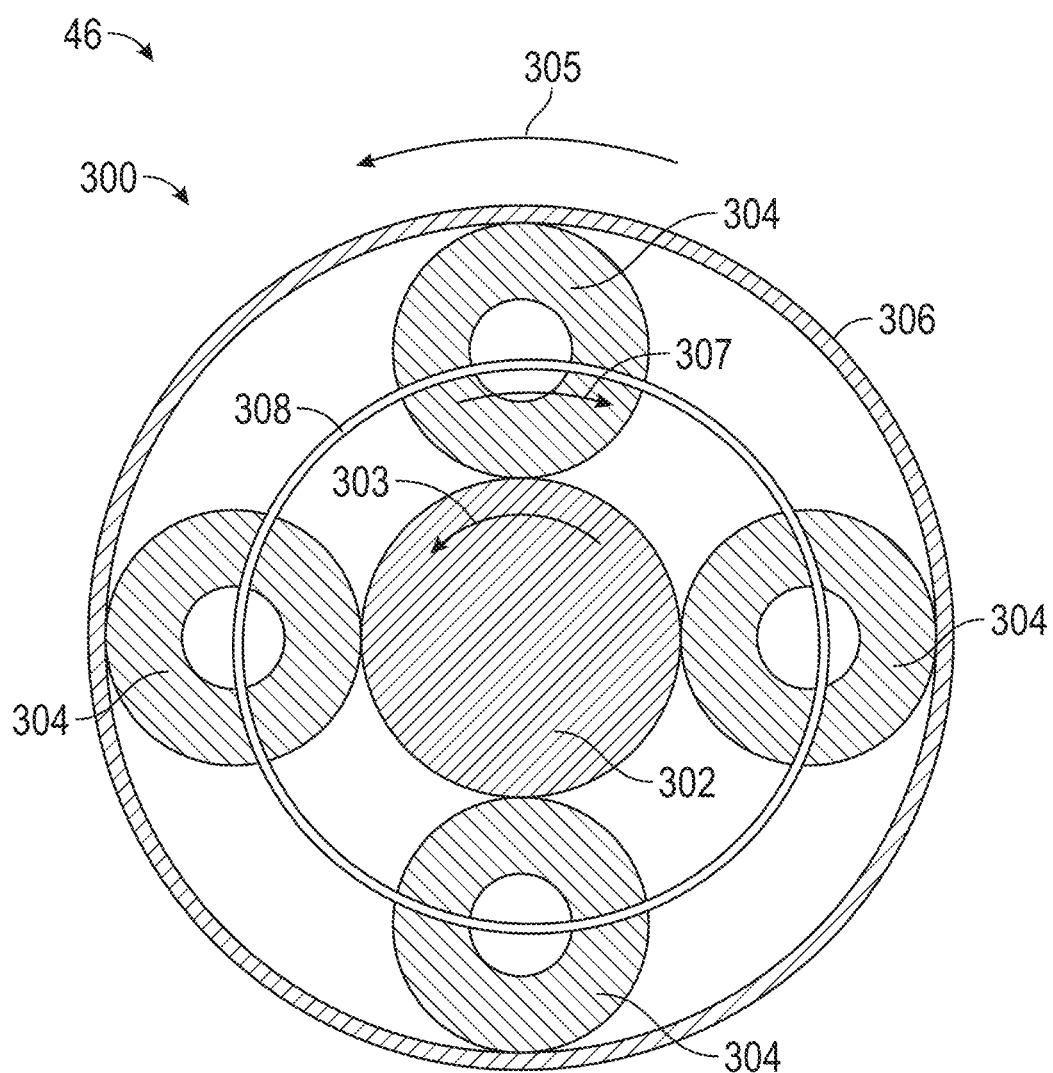
FIG. 3A is a schematic cross-sectional view of the gearbox assembly of the turbine engine of FIG. 1, taken along a latitudinal centerline axis of the gearbox assembly, and having a gear assembly, according to another embodiment.
Figure 3B:
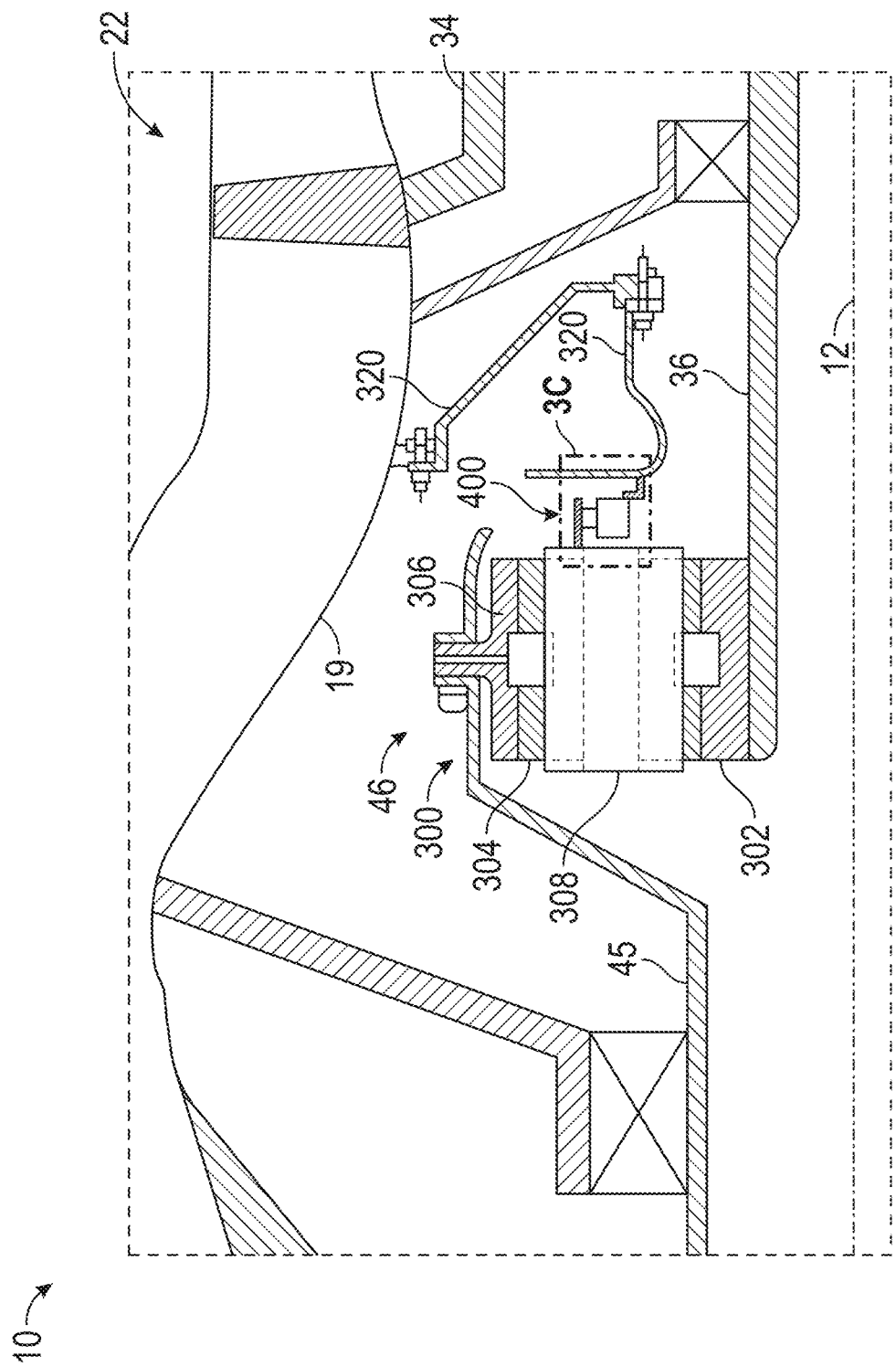
FIG. 3B is a schematic partial cross-sectional view of the gearbox assembly with the gear assembly of FIG. 3A and the turbine engine, taken along a longitudinal centerline axis of the turbine engine, according to the present disclosure.

FIG. 3A is a schematic cross-sectional view of the gearbox assembly 46 of the turbine engine 10 (FIG. 1), taken along a latitudinal centerline axis of the gearbox assembly 46, and having a gear assembly 300, according to another embodiment. FIG. 3B is a schematic partial cross-sectional view of the gearbox assembly 46 with the gear assembly 300 and the turbine engine, taken at the longitudinal centerline axis 12 of the turbine engine 10, according to the present disclosure. The gear assembly 300 includes a plurality of gears 302, 304, and 306. The plurality of gears 302, 304, and 306 includes a first gear 302, a plurality of second gears 304, and a third gear 306. The plurality of gears 302, 304, and 306 is substantially similar to the plurality of gears 102, 104, and 106 of FIGS. 2A to 2E. The plurality of second gears 304 is constrained by a second gear carrier 308.

The gear assembly 300 can be arranged as an epicyclic gear assembly. In the epicyclic gear assembly, the gear assembly 300 can be arranged in a star arrangement or a rotating ring gear type gear assembly (e.g., the third gear 306 is rotating about the longitudinal centerline axis 12 and the second gear carrier 308 is fixed and stationary). In such an arrangement, the output shaft (e.g., the propulsor shaft 45) is driven by the third gear 306. For example, the third gear 306 is coupled to the propulsor shaft 45 (FIG. 1) such that rotation of the third gear 306 causes the propulsor shaft 45, and, thus, the propulsor 38, to rotate. In this way, the third gear 306 is an output of the gear assembly 300. While an epicyclic gear assembly is detailed herein, the gear assembly 300 can include any type of gear assembly including, for example, a compound gear assembly, a multiple stage gear assembly, or the like.

The first gear 302 is coupled to the input shaft of the gearbox assembly 46 such that rotation of the input shaft causes the first gear 302 to rotate. In particular, the first gear 302 is coupled to the LP shaft 36 such that rotation of the LP shaft 36 causes the first gear 302 to rotate. In this way, the input shaft applies an input torque 303 through the first gear 302 in an input torque direction such that the first gear 302 rotates in a first rotational direction. Radially outward of the first gear 302, and intermeshing therewith, is the plurality of second gears 304 that is supported by the second gear carrier 308. The second gear carrier 308 supports and constrains the plurality of second gears 304 such that each of the plurality of second gears 304 is enabled to rotate about a second gear longitudinal centerline axis of each of the plurality of second gears 304, while the second gear carrier 308 prevents the plurality of second gears 304 from rotating about the periphery of the first gear 302 (about the longitudinal centerline axis 12 of the turbine engine 10).

Radially outwardly of the plurality of second gears 304, and intermeshing therewith, is the third gear 306, which is an annular ring gear. In particular, the plurality of second gears 304 transfers the input torque 303 to the third gear 306, thereby applying an output torque 305 on the third gear 306 and rotating the third gear 306 about the longitudinal centerline axis 12 in a second rotational direction. In the embodiment of FIGS. 3A and 3B, the output torque direction is the same as the input torque direction such that the second rotational direction is the same as the first rotational direction. In this way, the third gear 306 rotates and drives rotation of the output shaft. In particular, the third gear 306 is coupled via the propulsor shaft 45 to the propulsor 38 (FIG. 1) and rotates to drive rotation of the propulsor 38 about the longitudinal centerline axis 12 in the second rotational direction.

The plurality of second gears 304, which is stationary with respect to the longitudinal centerline axis 12, applies a reaction torque 307 against the second gear carrier 308 in a reaction torque direction. The reaction torque direction is opposite the output torque direction. In the embodiment of FIGS. 3A and 3B, the reaction torque direction is opposite the input torque direction.

As shown in FIG. 3B, the gearbox assembly 46 is coupled to the engine static structure 19 by a gearbox assembly coupling 320. The gearbox assembly coupling 320 is coupled to the second gear carrier 308 such that the gearbox assembly coupling 320 transfers a load from the second gear carrier 308 to the engine static structure 19. In the embodiments of FIGS. 3A and 3B, the gearbox assembly 46 comprises a gearbox assembly disengagement system 400 that selectively disengages the gearbox assembly 46 from the engine static structure 19 such that the gearbox assembly 46 rotates with rotation of the propulsor 38 (FIG. 1), as detailed further below.

Figure 3C:
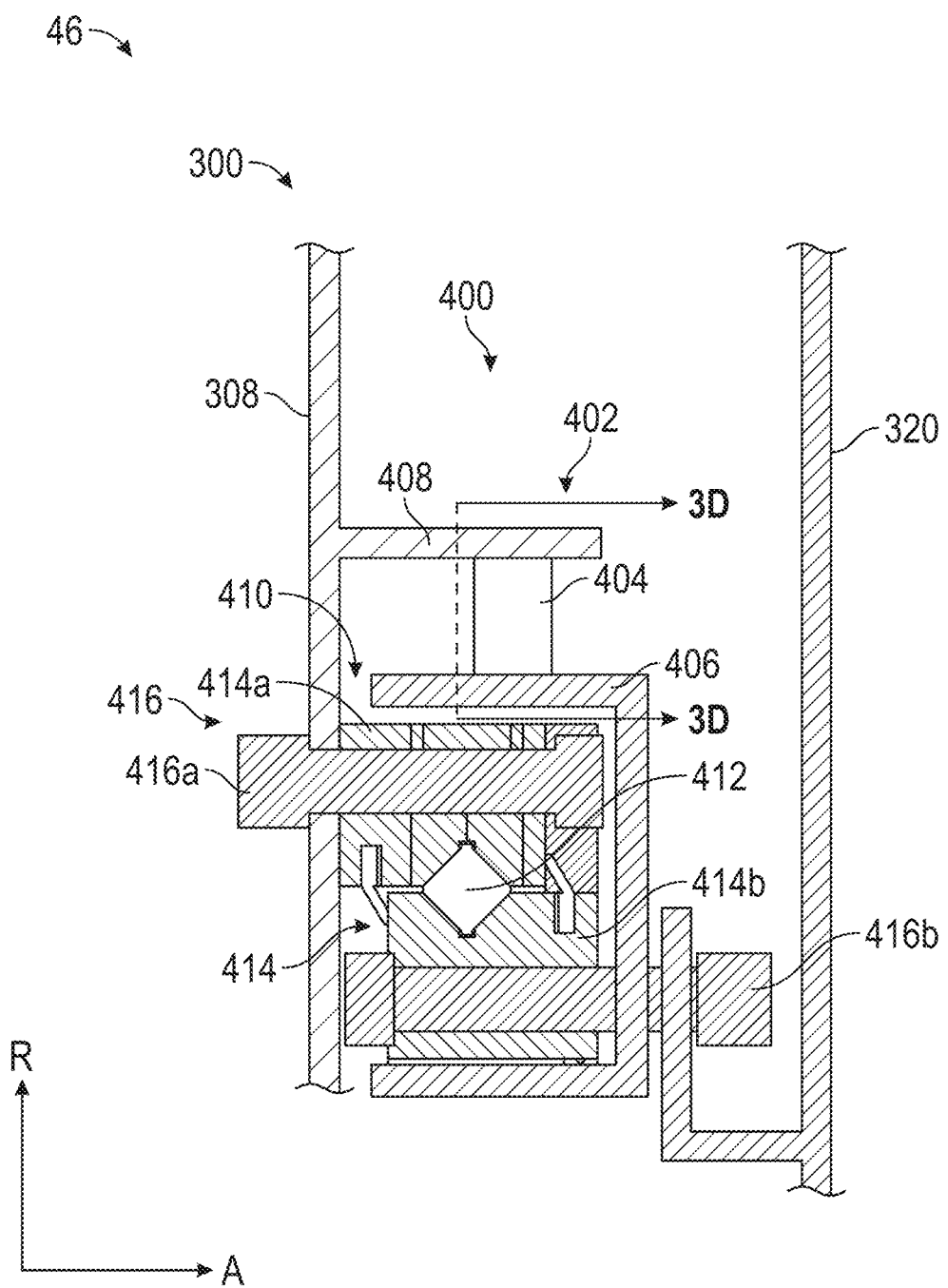
FIG. 3C is an enlarged schematic cross-sectional view of a gearbox assembly disengagement system for the gearbox assembly of FIGS. 3A and 3B, according to another embodiment.

FIG. 3C is an enlarged schematic cross-sectional view of the gearbox assembly disengagement system 400, taken at detail 3C in FIG. 3B, according to the present disclosure. The gearbox assembly disengagement system 400 includes a one-way clutch 402. The one-way clutch 402 includes a plurality of sprags 404 (only one shown in FIG. 3C). The plurality of sprags 404 is disposed between the second gear carrier 308 and the gearbox assembly coupling 320. In particular, the plurality of sprags 404 is disposed between a first sprag seat 406 and a second sprag seat 408. The first sprag seat 406 is defined by the gearbox assembly coupling 320 and is annular. For example, the first sprag seat 406 extends substantially axially from the gearbox assembly coupling 320. In FIG. 3C, the first sprag seat 406 is coupled to the gearbox assembly coupling 320. In some embodiments, the first sprag seat 406 forms a single, unitary component with the gearbox assembly coupling 320. The second sprag seat 408 is defined by the second gear carrier 308 and is annular. For example, the second sprag seat 408 extends substantially axially from the second gear carrier 308. The first sprag seat 406 is radially inward of the second sprag seat 408. In some embodiments, the first sprag seat 406 can be radially outward of the second sprag seat 408. The plurality of sprags 404 selectively engages and disengages the second gear carrier 308 (e.g., the second sprag seat 408), as detailed further below.

The gearbox assembly disengagement system 400 also includes one or more bearings 410 that support the second gear carrier 308, and allow the second gear carrier 308 to rotate, with respect to the gearbox assembly coupling 320. The one or more bearings 410 are roller bearings that include a plurality of rolling elements 412. In particular, the one or more bearings 410 are single row crossed roller bearings. In such a configuration, the one or more bearings 410 include a single row of the plurality of rolling elements 412. The one or more bearings 410 constrain the second gear carrier 308 in the axial direction A and in the radial direction R using only the single row of the plurality of rolling elements 412. In particular, the rolling elements 412 are disposed at an angle to distribute loads between the second gear carrier 308 and the gearbox assembly coupling 320 in the axial direction A and in the radial direction R. The one or more bearings 410 also constrain a bending moment that is perpendicular to the axis of rotation of the second gear carrier 308. In this way, the one or more bearings 410 support the second gear carrier 308 in all degrees of freedom, except in the rotational direction, to allow the second gear carrier 308 to rotate when the one-way clutch 402 is disengaged, as detailed further below. The one or more bearings 410 include a plurality of rings 414 that constrains the plurality of rolling elements 412 therein. In particular, the plurality rings 414 includes a first ring 414a and a second ring 414b, and the plurality of rolling elements 412 is disposed between the first ring 414a and the second ring 414b.

The one or more bearings 410 are coupled to the second gear carrier 308 and the gearbox assembly coupling 320 by one or more coupling mechanisms 416. The one or more coupling mechanisms 416 can include, for example, bolts, pins, or the like, for securing the one or more bearings 410 to the second gear carrier 308 and the gearbox assembly coupling 320. In particular, the one or more coupling mechanisms 416 include a first coupling mechanism 416a and a second coupling mechanism 416b. The first ring 414a is coupled to the second gear carrier 308 by the first coupling mechanism 416a. The second ring 414b is coupled to the gearbox assembly coupling 320 by the second coupling mechanism 416b. In some embodiments, the second gear carrier 308 defines the first ring 414a such that the first ring 414a and the second gear carrier 308 form a single, unitary component. In some embodiments, the gearbox assembly coupling 320 defines the second ring 414b such that the second ring 414b and the gearbox assembly coupling 320 form a single, unitary component.

Figure 3E:
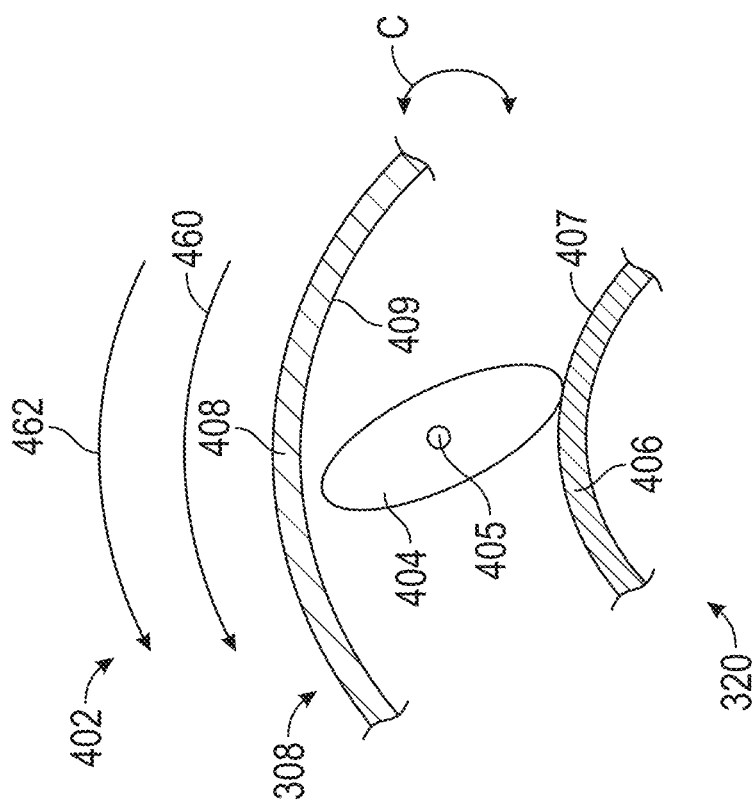
FIG. 3E is an enlarged schematic partial cross-sectional view of the one-way clutch of FIG. 3D, in a disengaged position, according to the present disclosure.
Figure 3D:
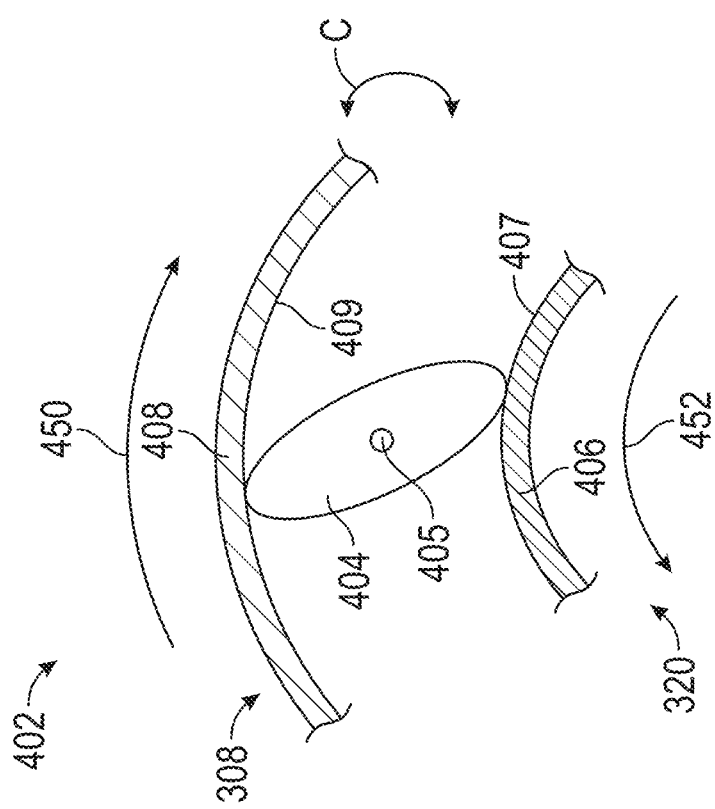
FIG. 3D is an enlarged schematic partial cross-sectional view of a one-way clutch of the gearbox assembly disengagement system, taken along section line 3D-3D in FIG. 3C, in an engaged position, according to another embodiment.

FIG. 3D is an enlarged schematic partial cross-sectional view of the one-way clutch 402, taken along section line 3D-3D in FIG. 3C, in an engaged position, according to the present disclosure. FIG. 3E is an enlarged schematic partial cross-sectional view of the one-way clutch 402 of FIG. 3D, in a disengaged position, according to the present disclosure. The plurality of sprags 404 is spaced circumferentially about the gearbox assembly coupling 320 (the first sprag seat 406) and the second gear carrier 308 (the second sprag seat 408). Each sprag 404 is rotationally coupled about a pin 405. The sprags 404 are coupled, either directly or indirectly, to the gearbox assembly coupling 320 (the first sprag seat 406). In the embodiment of FIGS. 3D and 3E, the sprags 404 are illustrated as coupled to a radially outer surface 407 of the gearbox assembly coupling 320 (the first sprag seat 406). The sprags 404 selectively engage a radially inner surface 409 of the second gear carrier 308 (the second sprag seat 408), as detailed further below.

Referring to FIGS. 3B and 3D, when the gearbox assembly 46 (the turbine engine 10) is operating during normal operation, the input shaft (e.g., the LP shaft 36) rotates, which causes torque to be transferred from the input shaft to the output shaft (e.g., the propulsor shaft 45) through the gearbox assembly 46. This causes the output shaft to rotate in an operational rotational direction. During the normal operation, the gearbox assembly disengagement system 400 engages the gearbox assembly 46 (e.g., the second gear carrier 308) such that the gearbox assembly 46 is engaged with the gearbox assembly coupling 320. This prevents the gearbox assembly 46 (e.g., the second gear carrier 308) from rotating. In particular, the plurality of sprags 404 engages with the gearbox assembly 46 (e.g., the second sprag seat 408 of the second gear carrier 308) and the gearbox assembly coupling 320 (e.g., the first sprag seat 406). That is, friction between the sprags 404 and the radially inner surface 409 of the second gear carrier 308 prevents the gearbox assembly 46 (e.g., the second gear carrier 308) from rotating, while the other gears (e.g., the first gear 302 and the third gear 306) rotate about the longitudinal centerline axis 12.

The torque from the input shaft is transferred through the gear assembly 300 to the gearbox assembly coupling 320. In particular, the gear assembly 300 transfers the torque, referred to as a gearbox assembly operational torque 450, from the gearbox assembly 46 (e.g., from the second gear carrier 308) to the gearbox assembly coupling 320, and the gearbox assembly operational torque 450 acts on the gearbox assembly coupling 320. The gearbox assembly operational torque 450 acts in a first torque direction as indicated by the gearbox assembly operational torque 450 in FIG. 3D. The gearbox assembly coupling 320 applies a reaction torque, also referred to as a gearbox assembly coupling reaction torque 452, on the gearbox assembly 46 (e.g., on the second gear carrier 308) that is opposite the gearbox assembly operational torque 450.

The torque transfer from the gearbox assembly 46 to the gearbox assembly coupling 320, and the reaction torque transfer from the gearbox assembly coupling 320 to the gearbox assembly 46, occurs due to the plurality of sprags 404 engaging (contacting) both the gearbox assembly 46 (e.g., at the radially inner surface 409 of the second gear carrier 308) and the gearbox assembly coupling 320 (e.g., at the radially outer surface 407 of the gearbox assembly coupling 320) during the normal operation. For example, there is a tendency for the sprags 404 to pivot about the pins 405 to a position that is more radially inclined than the disengaged position of FIG. 3E. Thus, the second gear carrier 308 (e.g., the plurality of second gears 304) and the gearbox assembly 46 are prevented from rotating about the longitudinal centerline axis 12 during the normal operation.

With reference to FIGS. 3B, 3C, and 3E, during a reverse torque condition (e.g., when the propulsor 38 is windmilling), the torque is transferred from the output shaft (e.g., the propulsor shaft 45) to the input shaft (e.g., the LP shaft 36) through the gearbox assembly 46. In such conditions, the output shaft rotates in a reverse torque rotational direction. During the reverse torque condition, the gearbox assembly disengagement system 400 disengages the gearbox assembly 46 (e.g., the second gear carrier 308) such that the gearbox assembly 46 is disengaged from the gearbox assembly coupling 320. This allows the gearbox assembly 46 (e.g., the second gear carrier 308) to rotate such that there is no relative rotation of the plurality of gears 302, 304, and 306 of the gear assembly 300. In particular, the plurality of sprags 404 disengages from the gearbox assembly 46 (e.g., the second sprag seat 408 of the second gear carrier 308) such that the sprags 404 allow the gearbox assembly 46 (e.g., the second gear carrier 308) to rotate with respect to the gearbox assembly coupling 320.

The torque from the output shaft is transferred through the gear assembly 300. In particular, the gear assembly 300 transfers the torque, referred to as a gearbox assembly reverse torque 460, to rotate the gearbox assembly 46 (e.g., the second gear carrier 308). The gearbox assembly reverse torque 460 acts in a second torque direction as indicated by the gearbox assembly reverse torque 460 in FIG. 3E. The second torque direction is opposite the first torque direction such that the gearbox assembly reverse torque 460 is opposite the gearbox assembly operational torque (FIG. 3D). This causes the plurality of sprags 404 to disengage from the gearbox assembly 46 (e.g., from the second sprag seat 408 of the second gear carrier 308). In particular, the sprags 404 pivot about the pins 405 to a position that is less radially inclined than the engaged position of FIG. 3D. When the sprags 404 are disengaged from the gearbox assembly 46, there is no torque reaction from the gearbox assembly coupling 320 on the gearbox assembly 46. Thus, the gearbox assembly 46 (e.g., the second gear carrier 308) rotates with respect to the gearbox assembly coupling 320 in a gearbox assembly reverse torque rotational direction 462. Accordingly, the gearbox assembly 46 (e.g., the second gear carrier 308) rotates during the reverse torque condition such that there is no relative rotation between the plurality of gears 302, 304, and 306. That is, the gears 302, 304, and 306 are static relative to each other.

During the reverse torque condition, and while the gearbox assembly 46 is rotating, the one or more bearings 410 support the gearbox assembly 46. In particular, the one or more bearings 410 support rotation of the gearbox assembly 46 (e.g., the second gear carrier 308) in the circumferential direction C, while constraining the gearbox assembly 46 in the radial direction R and the axial direction A. Thus, the one or more bearings 410 support rotation of the gearbox assembly 46 with respect to the gearbox assembly coupling 320 during the reverse torque condition.

Accordingly, the gearbox assembly disengagement systems 200 and 400 disengage the gearbox assembly 46 from the engine static structure 19 to allow rotation of all of the gears of the gear assemblies 100 and 300. With rotation of all the gears, there is no relative rotation among the gears, and the bearings of the gear assemblies 100 and 300 do not require the lubricant. Thus, the gearbox assembly disengagement systems 200 and 400 prevent bearing seizure during the reverse torque condition without having to supply lubricant to the bearings during the reverse torque condition. Therefore, the gearbox assembly disengagement systems 200 and 400 eliminate the need for an auxiliary lubrication system and reduce complexity of the lubrication system as compared to gearbox assemblies without the benefit of the present disclosure. Further, the one-way clutches 202 and 402 provide for simplicity of the gearbox assembly disengagement systems 200 and 400 as compared to disengagement systems without the benefit of the present disclosure.

Further aspects of the present disclosure are provided by the subject matter of the following clauses.

A gearbox assembly for a turbine engine having an engine static structure comprises a gear assembly, an input shaft coupled to the gear assembly, an output shaft drivingly coupled to the input shaft through the gear assembly, and a gearbox assembly disengagement system comprising a one-way clutch that engages the gearbox assembly to the engine static structure during a normal operation of the turbine engine and disengages the gearbox assembly from the engine static structure during a reverse torque condition.

The gearbox assembly of the preceding clause, the output shaft transferring a gearbox assembly reverse torque to the gear assembly during the reverse torque condition, and the gearbox assembly reverse torque causes the gearbox assembly disengagement system to disengage the gearbox assembly from the engine static structure.

The gearbox assembly of any preceding clause, further comprising a gearbox assembly coupling that couples the gearbox assembly to the engine static structure, the one-way clutch being disposed between the gearbox assembly and the gearbox assembly coupling.

The gearbox assembly of any preceding clause, the one-way clutch including a plurality of sprags that engages the gearbox assembly and the gearbox assembly coupling during the normal operation.

The gearbox assembly of any preceding clause, each of the plurality of sprags including a pin such that each of the plurality of sprags is pivotable about the pin, and each of the plurality of sprags pivots about the pin to disengage the gearbox assembly during the reverse torque condition.

The gearbox assembly of any preceding clause, the gearbox assembly including a first sprag seat and the gearbox assembly coupling includes a second sprag seat, and the plurality of sprags is disposed between the first sprag seat and the second sprag seat.

The gearbox assembly of any preceding clause, further comprising one or more bearings disposed between the gearbox assembly and the gearbox assembly coupling, the one or more bearings supporting rotation of the gearbox assembly during the reverse torque condition.

The gearbox assembly of any preceding clause, the one or more bearings being single row crossed roller bearings.

The gearbox assembly of any preceding clause, the one or more bearings including a first ring, a second ring, and a plurality of rolling elements disposed between the first ring and the second ring.

The gearbox assembly of any preceding clause, the first ring being coupled to the gearbox assembly, and the second ring is coupled to the gearbox assembly coupling.

The gearbox assembly of any preceding clause, the gear assembly including a plurality of gears.

The gearbox assembly of the preceding clause, the plurality of gears including a first gear, a plurality of second gears, and a third gear.

The gearbox assembly of any preceding clause, the first gear being a sun gear, the second gears are planet gears, and the third gear is a ring gear.

The gearbox assembly of any preceding clause, the plurality of second gears being constrained by a second gear carrier.

The gearbox assembly of any preceding clause, the input shaft being coupled to the first gear, and the input shaft drives the first gear during the normal operation.

The gearbox assembly of any preceding clause, the output shaft being coupled to the second gear carrier, and the second gear carrier drives the output shaft during the normal operation.

The gearbox assembly of any preceding clause, the first gear transferring an input torque to the plurality of second gears such that the first gear applies an output torque on the plurality of second gears in an output torque direction during the normal operation.

The gearbox assembly of any preceding clause, the third gear applying a reaction torque against the plurality of second gears in a reaction torque direction during the normal operation.

The gearbox assembly of any preceding clause, the engine static component forming an inner portion of a core air flowpath of the turbine engine.

The gearbox assembly of any preceding clause, the gearbox assembly coupling being coupled to the third gear such that the gearbox assembly coupling transfers a load from the third gear to the engine static component during the normal operation.

The gearbox assembly of any preceding clause, the first sprag seat being defined by the third gear, and the second sprag seat is defined by the gearbox assembly coupling.

The gearbox assembly of any preceding clause, the first sprag seat being radially inward of the second sprag seat.

The gearbox assembly of any preceding clause, the one or more bearings constraining the third gear in an axial direction and a radial direction.

The gearbox assembly of any preceding clause, the plurality of rolling elements being disposed at an angle to distribute loads between the third gear and the gearbox assembly coupling.

The gearbox assembly of any preceding clause, the one or more bearings being coupled to the gearbox assembly and the gearbox assembly coupling by one or more coupling mechanisms.

The gearbox assembly of the preceding clause, the one or more coupling mechanisms including a first coupling mechanism that couples the first ring to the third gear.

The gearbox assembly of any preceding clause, the one or more coupling mechanisms including a second coupling mechanism that couples the second ring to the gearbox assembly coupling.

The gearbox assembly of any preceding clause, the plurality of sprags being coupled to the gearbox assembly coupling.

The gearbox assembly of any preceding clause, the gearbox assembly reverse torque acting in a second torque direction that is opposite the first torque direction.

The gearbox assembly of any preceding clause, the one or more bearings supporting rotation of the gearbox assembly in a circumferential direction during the reverse torque condition while constraining the gearbox assembly in the radial direction and the axial direction.

The gearbox assembly of any preceding clause, the gearbox assembly disengagement system engaging the third gear during the normal operation.

The gearbox assembly of any preceding clause, the gearbox assembly disengagement system disengaging the third gear during the reverse torque condition.

The gearbox assembly of any preceding clause, the output shaft being coupled to the third gear, and the third gear drives the output shaft during the normal operation.

The gearbox assembly of any preceding clause, the plurality of second gears transferring the input torque from the first gear to the third gear to apply an output torque on the third gear in an output torque direction.

The gearbox assembly of any preceding clause, the plurality of second gears applying a reaction torque against the second gear carrier in a reaction torque direction that is opposite the output torque direction.

The gearbox assembly of any preceding clause, the gearbox assembly coupling being coupled to the second gear carrier such that the gearbox assembly coupling transfers a load from the second gear carrier to the engine static structure during the normal operation.

The gearbox assembly of any preceding clause, the gearbox assembly coupling defining the first sprag seat, and the second gear carrier defines the second sprag seat.

The gearbox assembly of any preceding clause, the first sprag seat being radially outward of the second sprag seat.

The gearbox assembly of any preceding clause, the one or more bearings being disposed between the second gear carrier and the gearbox assembly coupling.

The gearbox assembly of any preceding clause, the first ring being coupled to the second gear carrier, and the second ring is coupled to the gearbox assembly coupling.

The gearbox assembly of any preceding clause, the first ring being coupled to the second gear carrier by the first coupling mechanism.

The gearbox assembly of any preceding clause, the second ring being coupled to the gearbox assembly coupling by the second coupling mechanism.

The gearbox assembly of any preceding clause, the gearbox assembly disengagement system engaging the second gear carrier during the normal operation.

The gearbox assembly of any preceding clause, the gearbox assembly disengagement system disengaging the second gear carrier during the reverse torque condition.

A turbine engine comprises a turbo-engine having a low-pressure shaft, a propulsor having a propulsor shaft, an engine static structure, and a gearbox assembly comprising a gear assembly, the propulsor shaft being drivingly coupled to the low-pressure shaft through the gear assembly, and a gearbox assembly disengagement system comprising a one-way clutch that engages the gearbox assembly to the engine static structure during a normal operation of the turbine engine and disengages the gearbox assembly from the engine static structure during a reverse torque condition.

The turbine engine of any preceding clause, the propulsor shaft transferring a gearbox assembly reverse torque to the gear assembly during the reverse torque condition, and the gearbox assembly reverse torque causes the gearbox assembly disengagement system to disengage the gearbox assembly from the engine static structure.

The turbine engine of any preceding clause, further comprising a gearbox assembly coupling that couples the gearbox assembly to the engine static structure, the one-way clutch being disposed between the gearbox assembly and the gearbox assembly coupling.

The turbine engine of any preceding clause, the one-way clutch including a plurality of sprags that engages the gearbox assembly and the gearbox assembly coupling during the normal operation.

The turbine engine of any preceding clause, each of the plurality of sprags including a pin such that each of the plurality of sprags is pivotable about the pin, and each of the plurality of sprags pivots about the pin to disengage the gearbox assembly during the reverse torque condition.

The turbine engine of any preceding clause, the gearbox assembly including a first sprag seat and the gearbox assembly coupling includes a second sprag seat, and the plurality of sprags is disposed between the first sprag seat and the second sprag seat.

The turbine engine of any preceding clause, further comprising one or more bearings disposed between the gearbox assembly and the gearbox assembly coupling, the one or more bearings supporting rotation of the gearbox assembly during the reverse torque condition.

The turbine engine of any preceding clause, the one or more bearings being single row crossed roller bearings.

The turbine engine of any preceding clause, the one or more bearings including a first ring, a second ring, and a plurality of rolling elements disposed between the first ring and the second ring.

The turbine engine of any preceding clause, the first ring being coupled to the gearbox assembly, and the second ring is coupled to the gearbox assembly coupling.

The turbine engine of any preceding clause, the gear assembly including a plurality of gears.

The turbine engine of the preceding clause, the plurality of gears including a first gear, a plurality of second gears, and a third gear.

The turbine engine of the preceding clause, the first gear being a sun gear, the second gears are planet gears, and the third gear is a ring gear.

The turbine engine of any preceding clause, the plurality of second gears being constrained by a second gear carrier.

The turbine engine of any preceding clause, the low-pressure shaft being coupled to the first gear, and the low-pressure shaft drives the first gear during the normal operation.

The turbine engine of any preceding clause, the propulsor shaft being coupled to the second gear carrier, and the second gear carrier drives the propulsor shaft during the normal operation.

The turbine engine of any preceding clause, the first gear transferring an input torque to the plurality of second gears such that the first gear applies an output torque on the plurality of second gears in an output torque direction during the normal operation.

The turbine engine of any preceding clause, the third gear applying a reaction torque against the plurality of second gears in a reaction torque direction during the normal operation.

The turbine engine of any preceding clause, the turbo-engine including a core air flowpath, and the engine static component forms an inner portion of the core air flowpath.

The turbine engine of any preceding clause, the gearbox assembly coupling being coupled to the third gear such that the gearbox assembly coupling transfers a load from the third gear to the engine static component during the normal operation.

The turbine engine of any preceding clause, the first sprag seat being defined by the third gear, and the second sprag seat is defined by the gearbox assembly coupling.

The turbine engine of any preceding clause, the first sprag seat being radially inward of the second sprag seat.

The turbine engine of any preceding clause, the one or more bearings constraining the third gear in an axial direction and a radial direction.

The turbine engine of any preceding clause, the plurality of rolling elements being disposed at an angle to distribute loads between the third gear and the gearbox assembly coupling.

The turbine engine of any preceding clause, the one or more bearings being coupled to the gearbox assembly and the gearbox assembly coupling by one or more coupling mechanisms.

The turbine engine of any preceding clause, the one or more coupling mechanisms including a first coupling mechanism that couples the first ring to the third gear.

The turbine engine of any preceding clause, the one or more coupling mechanisms including a second coupling mechanism that couples the second ring to the gearbox assembly coupling.

The turbine engine of any preceding clause, the plurality of sprags being coupled to the gearbox assembly coupling.

The turbine engine of any preceding clause, the gearbox assembly reverse torque acting in a second torque direction that is opposite the first torque direction.

The turbine engine of any preceding clause, the one or more bearings supporting rotation of the gearbox assembly in a circumferential direction during the reverse torque condition while constraining the gearbox assembly in the radial direction and the axial direction.

The turbine engine of any preceding clause, the gearbox assembly disengagement system engaging the third gear during the normal operation.

The turbine engine of any preceding clause, the gearbox assembly disengagement system disengaging the third gear during the reverse torque condition.

The turbine engine of any preceding clause, the output shaft being coupled to the third gear, and the third gear drives the output shaft during the normal operation.

The turbine engine of any preceding clause, the plurality of second gears transferring the input torque from the first gear to the third gear to apply an output torque on the third gear in an output torque direction.

The turbine engine of any preceding clause, the plurality of second gears applying a reaction torque against the second gear carrier in a reaction torque direction that is opposite the output torque direction.

The turbine engine of any preceding clause, the gearbox assembly coupling being coupled to the second gear carrier such that the gearbox assembly coupling transfers a load from the second gear carrier to the engine static structure during the normal operation.

The turbine engine of any preceding clause, the gearbox assembly coupling defining the first sprag seat, and the second gear carrier defines the second sprag seat.

The turbine engine of any preceding clause, the first sprag seat being radially outward of the second sprag seat.

The turbine engine of any preceding clause, the one or more bearings being disposed between the second gear carrier and the gearbox assembly coupling.

The turbine engine of any preceding clause, the first ring being coupled to the second gear carrier, and the second ring is coupled to the gearbox assembly coupling.

The turbine engine of any preceding clause, the first ring being coupled to the second gear carrier by the first coupling mechanism.

The turbine engine of any preceding clause, the second ring being coupled to the gearbox assembly coupling by the second coupling mechanism.

The turbine engine of any preceding clause, the gearbox assembly disengagement system engaging the second gear carrier during the normal operation.

The turbine engine of any preceding clause, the gearbox assembly disengagement system disengaging the second gear carrier during the reverse torque condition.

A method of engaging and disengaging a gearbox assembly from an engine static structure of a turbine engine, the method comprising engaging, with a one-way clutch, the gearbox assembly to the engine static structure during a normal operation of the turbine engine, and disengaging, with the one-way clutch, the gearbox assembly from the engine static structure during a reverse torque condition.

The method of the preceding clause, the gearbox assembly being the gearbox assembly of any preceding clause.

The method of any preceding clause, further comprising transferring, by the output shaft, a gearbox assembly reverse torque to the gear assembly during the reverse torque condition, and disengaging, by the gearbox assembly reverse torque, the gearbox assembly from the engine static structure.

The method of any preceding clause, the one-way clutch including a plurality of sprags, and the method further comprises engaging the gearbox assembly and the gearbox assembly coupling with the plurality of sprags during the normal operation.

The method of any preceding clause, each of the plurality of sprags including a pin, and the method further comprises pivoting each of the plurality of sprags about the pin to disengage the gearbox assembly during the reverse torque condition.

The method of any preceding clause, further comprising supporting rotation of the gearbox assembly during the reverse torque condition with one or more bearings disposed between the gearbox assembly and the gearbox assembly coupling.

The method of any preceding clause, the input shaft being coupled to the first gear, and the method further comprises driving the first gear with the input shaft during the normal operation.

The method of any preceding clause, the output shaft being coupled to the second gear carrier, and the method further comprises driving the output shaft with the second gear carrier during the normal operation.

The method of any preceding clause, further comprising transferring an input torque from the first gear to the plurality of second gears such that the first gear applies an output torque on the plurality of second gears in an output torque direction during the normal operation.

The method of any preceding clause, further comprising applying a reaction torque from the third gear against the plurality of second gears in a reaction torque direction during the normal operation.

The method of any preceding clause, the gearbox assembly coupling being coupled to the third gear, and the method further comprises transferring a load from the third gear to the engine static component through the gearbox assembly coupling during the normal operation.

The method of any preceding clause, further comprising constraining the third gear in an axial direction and a radial direction with the one or more bearings.

The method of any preceding clause, the gearbox assembly reverse torque acting in a second torque direction that is opposite the first torque direction.

The method of any preceding clause, further comprising engaging, with the one-way clutch, the third gear during the normal operation.

The method of any preceding clause, further comprising disengaging, with the one-way clutch, the third gear during the reverse torque condition.

The method of any preceding clause, the output shaft being coupled to the third gear, and the method further comprises driving the output shaft with the third gear during the normal operation.

The method of any preceding clause, further comprising transferring the input torque from the first gear to the third gear through the plurality of second gears to apply an output torque on the third gear in an output torque direction.

The method of any preceding clause, further comprising applying a reaction torque against the second gear carrier with the plurality of second gears in a reaction torque direction that is opposite the output torque direction.

The method of any preceding clause, the gearbox assembly coupling being coupled to the second gear carrier, and the method further comprises transferring a load from the second gear carrier to the engine static structure during the normal operation.

The method of any preceding clause, further comprising engaging, with the one-way clutch, the second gear carrier during the normal operation.

The method of any preceding clause, further comprising disengaging, with the one-way clutch, the second gear carrier during the reverse torque condition.

A method of operating the turbine engine of any preceding clause, the method comprising transferring torque from the low-pressure shaft to the propulsor shaft through the gear assembly during a normal operation of the turbine engine, engaging, with a one-way clutch, the gearbox assembly to the engine static structure during the normal operation, transferring torque from the propulsor shaft to the gear assembly during a reverse torque condition, and disengaging, with the one-way clutch, the gearbox assembly from the engine static structure during the reverse torque condition.

The method of the preceding clause, further comprising the method of engaging and disengaging the gearbox assembly from the engine static structure of any preceding clause.

The method of any preceding clause, the turbine engine being the turbine engine of any preceding clause.

Although the foregoing description is directed to the preferred embodiments of the present disclosure, other variations and modifications will be apparent to those skilled in the art and may be made without departing from the disclosure. Moreover, features described in connection with one embodiment of the present disclosure may be used in conjunction with other embodiments, even if not explicitly stated above.

The invention claimed is:

1. A gearbox assembly for a turbine engine having an engine static structure, the gearbox assembly comprising:
   a gear assembly;
   an input shaft coupled to the gear assembly;
   an output shaft drivingly coupled to the input shaft through the gear assembly; and
   a gearbox assembly disengagement system comprising a one-way clutch that engages the gearbox assembly to the engine static structure during a normal operation of the turbine engine and disengages the gearbox assembly from the engine static structure during a reverse torque condition.

2. The gearbox assembly of claim 1, wherein the output shaft transfers a gearbox assembly reverse torque to the gear assembly during the reverse torque condition, and the gearbox assembly reverse torque causes the gearbox assembly disengagement system to disengage the gearbox assembly from the engine static structure.

3. The gearbox assembly of claim 1, further comprising a gearbox assembly coupling that couples the gearbox assembly to the engine static structure, the one-way clutch being disposed between the gearbox assembly and the gearbox assembly coupling.

4. The gearbox assembly of claim 3, wherein the one-way clutch includes a plurality of sprags that engages the gearbox assembly and the gearbox assembly coupling during the normal operation.

5. The gearbox assembly of claim 4, wherein each of the plurality of sprags includes a pin such that each of the plurality of sprags is pivotable about the pin, and each of the plurality of sprags pivots about the pin to disengage the gearbox assembly during the reverse torque condition.

6. The gearbox assembly of claim 4, wherein the gearbox assembly includes a first sprag seat and the gearbox assembly coupling includes a second sprag seat, and the plurality of sprags is disposed between the first sprag seat and the second sprag seat.

7. The gearbox assembly of claim 3, further comprising one or more bearings disposed between the gearbox assembly and the gearbox assembly coupling, wherein the one or more bearings support rotation of the gearbox assembly during the reverse torque condition.

8. The gearbox assembly of claim 7, wherein the one or more bearings are single row crossed roller bearings.

9. The gearbox assembly of claim 7, wherein the one or more bearings include a first ring, a second ring, and a plurality of rolling elements disposed between the first ring and the second ring.

10. The gearbox assembly of claim 9, wherein the first ring is coupled to the gearbox assembly, and the second ring is coupled to the gearbox assembly coupling.

11. A turbine engine comprising:
    a turbo-engine having a low-pressure shaft;
    a propulsor having a propulsor shaft;
    an engine static structure; and
    a gearbox assembly comprising:
      a gear assembly, wherein the propulsor shaft is drivingly coupled to the low-pressure shaft through the gear assembly; and
      a gearbox assembly disengagement system comprising a one-way clutch that engages the gearbox assembly to the engine static structure during a normal operation of the turbine engine and disengages the gearbox assembly from the engine static structure during a reverse torque condition.

12. The turbine engine of claim 11, wherein the propulsor shaft transfers a gearbox assembly reverse torque to the gear assembly during the reverse torque condition, and the gearbox assembly reverse torque causes the gearbox assembly disengagement system to disengage the gearbox assembly from the engine static structure.

13. The turbine engine of claim 11, further comprising a gearbox assembly coupling that couples the gearbox assembly to the engine static structure, the one-way clutch being disposed between the gearbox assembly and the gearbox assembly coupling.

14. The turbine engine of claim 13, wherein the one-way clutch includes a plurality of sprags that engages the gearbox assembly and the gearbox assembly coupling during the normal operation.

15. The turbine engine of claim 14, wherein each of the plurality of sprags includes a pin such that each of the plurality of sprags is pivotable about the pin, and each of the plurality of sprags pivots about the pin to disengage the gearbox assembly during the reverse torque condition.

16. The turbine engine of claim 14, wherein the gearbox assembly includes a first sprag seat and the gearbox assembly coupling includes a second sprag seat, and the plurality of sprags is disposed between the first sprag seat and the second sprag seat.

17. The turbine engine of claim 13, further comprising one or more bearings disposed between the gearbox assembly and the gearbox assembly coupling, wherein the one or more bearings support rotation of the gearbox assembly during the reverse torque condition.

18. The turbine engine of claim 17, wherein the one or more bearings are single row crossed roller bearings.

19. The turbine engine of claim 17, wherein the one or more bearings include a first ring, a second ring, and a plurality of rolling elements disposed between the first ring and the second ring.

20. The turbine engine of claim 19, wherein the first ring is coupled to the gearbox assembly, and the second ring is coupled to the gearbox assembly coupling.

* * * * *